(12) United States Patent
Roberts et al.

(10) Patent No.: US 10,683,951 B2
(45) Date of Patent: Jun. 16, 2020

(54) ELONGATE TAPE ELEMENT AND METHOD

(71) Applicant: GE Oil & Gas UK Limited, Bristol (GB)

(72) Inventors: Andrew Peter Roberts, Bristol (GB); Paul Snowdon, Bristol (GB); Philip Stephenson, Bristol (GB); Stephen Burgess, Bristol (GB); Suranjith Warnakulasuriya, Nottingham (GB)

(73) Assignee: GE Oil & Gas UK Limited, Bristol (GB)

( * ) Notice: Subject to any disclaimer, the term of this patent is extended or adjusted under 35 U.S.C. 154(b) by 468 days.

(21) Appl. No.: 14/783,827

(22) PCT Filed: Apr. 11, 2014

(86) PCT No.: PCT/GB2014/051134
§ 371 (c)(1),
(2) Date: Oct. 9, 2015

(87) PCT Pub. No.: WO2014/167346
PCT Pub. Date: Oct. 16, 2014

(65) Prior Publication Data
US 2016/0069486 A1    Mar. 10, 2016

(30) Foreign Application Priority Data
Apr. 12, 2013   (GB) .................................. 1306665.9

(51) Int. Cl.
*B21C 37/12*   (2006.01)
*F16L 11/14*   (2006.01)
(Continued)

(52) U.S. Cl.
CPC ............ *F16L 11/14* (2013.01); *B21C 37/121* (2013.01); *B21C 37/124* (2013.01);
(Continued)

(58) Field of Classification Search
CPC .......... F16L 11/14; F16L 11/082; F16L 57/02; F16L 11/16; F16L 11/083; B21C 37/124;
(Continued)

(56) References Cited

U.S. PATENT DOCUMENTS 846,996 A    3/1907  Greenfield
4,062,380 A  12/1977  Hofle
(Continued)

FOREIGN PATENT DOCUMENTS

AU    646477     2/1994
CN    1039196    1/1990
(Continued)

OTHER PUBLICATIONS

Popescu, M. et al. (2011) "Flow-Induced Acoustics in Corrugated Pipes", Communications in Computational Physics, vol. 10, N. 1, pp. 120-139.
(Continued)

*Primary Examiner* — Rick K Chang
(74) *Attorney, Agent, or Firm* — Knobbe, Martens, Olson & Bear, LLP

(57) ABSTRACT

An elongate tape element (508), a flexible pipe body and method of producing a flexible pipe body are disclosed. The tape element has a cross-sectional profile comprising a body portion (510) for being positioned between collapse resistant tape windings such that each body portion lies at least partially in a gap (512) between adjacent collapse resistant tape windings (501); and at least one wing portion (516) extending from an end region of the body portion (510), the at least one wing portion (516) configured to span the gap (512) and respectively abut with a radially inner surface of an adjacent collapse resistant tape winding (501).

18 Claims, 20 Drawing Sheets

Figure 1:
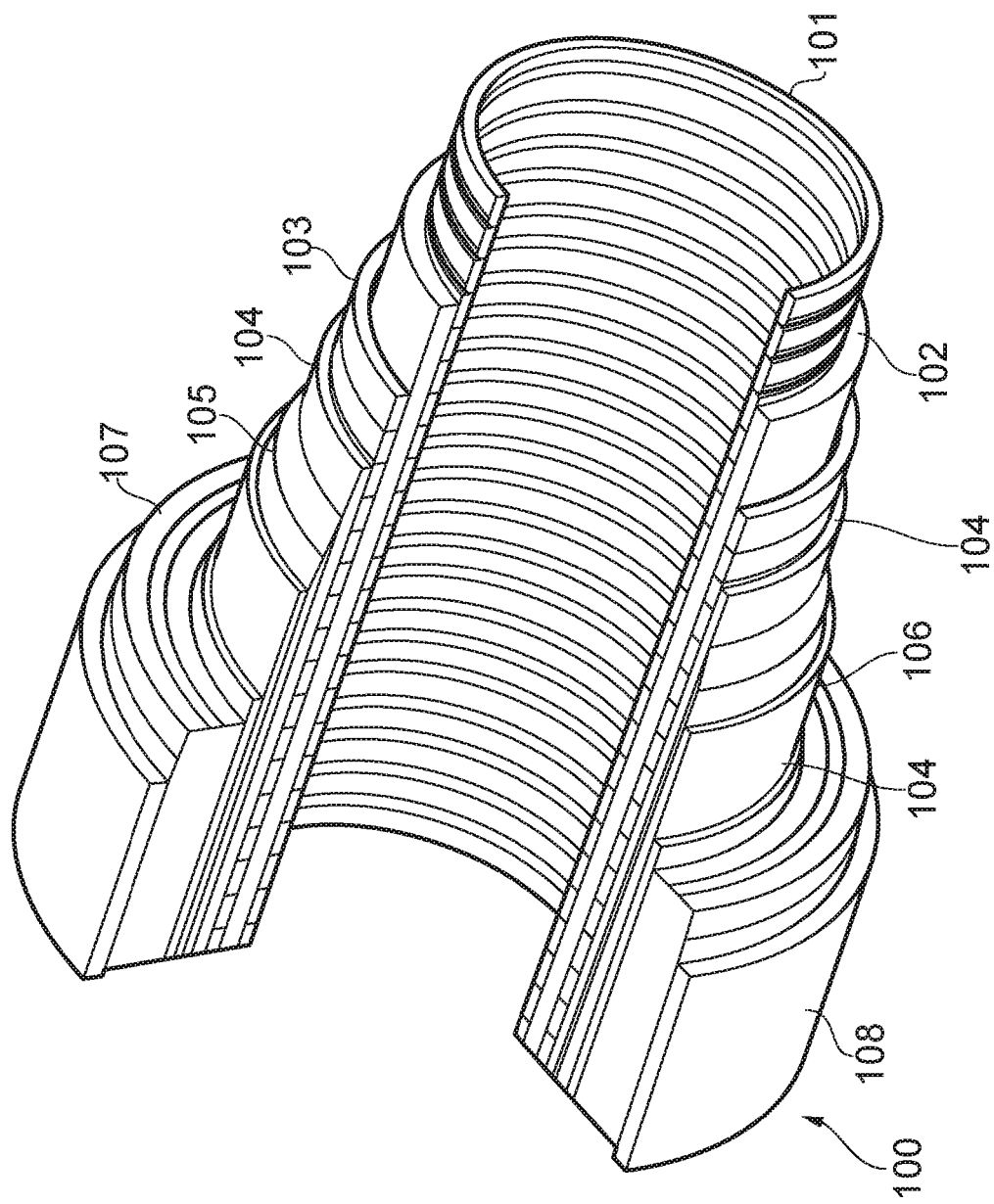

(51) Int. Cl.
*F16L 11/08* (2006.01)
*F16L 11/16* (2006.01)
*F16L 57/02* (2006.01)
*B29C 53/04* (2006.01)
B29L 9/00 (2006.01)
B29L 23/00 (2006.01)

(52) U.S. Cl.
CPC .......... *B21C 37/126* (2013.01); *B29C 53/043* (2013.01); *F16L 11/082* (2013.01); *F16L 11/083* (2013.01); *F16L 11/16* (2013.01); *F16L 57/02* (2013.01); *B29L 2009/00* (2013.01); *B29L 2023/22* (2013.01)

(58) Field of Classification Search
CPC ... B21C 37/126; B21C 37/121; B29C 53/043; B29L 2009/00; B29L 2023/22
See application file for complete search history.

(56) References Cited

U.S. PATENT DOCUMENTS

| | | | |
|---|---|---|---|
| 4,304,266 | A | 12/1981 | Kutnyak et al. |
| 4,597,276 | A | 7/1986 | Lucien |
| 4,800,928 | A | 1/1989 | Kanao |
| 5,669,420 | A | 9/1997 | Herrero et al. |
| 5,934,335 | A | 8/1999 | Hardy |
| 6,065,501 | A | 5/2000 | Feret et al. |
| 6,085,798 | A | 7/2000 | Nouveau |
| 6,024,135 | A | 9/2000 | Nobileau |
| 6,192,941 | B1 | 2/2001 | Mallen-Herrero et al. |
| 6,283,161 | B1 | 9/2001 | Feret |
| 6,354,333 | B1 * | 3/2002 | Dupoiron .............. F16L 11/081 138/129 |
| 6,668,867 | B2 | 12/2003 | Espinasse et al. |
| 6,840,286 | B2 | 1/2005 | Espinasse et al. |
| 6,889,718 | B2 | 5/2005 | Glejbøl et al. |
| 7,318,454 | B2 * | 1/2008 | Dupoiron ................ F15D 1/065 138/135 |
| 8,056,585 | B2 * | 11/2011 | Gudme ................... F16L 11/16 138/135 |
| 2001/0003992 | A1 | 6/2001 | Espinasse |
| 2002/0129862 | A1 | 9/2002 | Hupertz |
| 2003/0070719 | A1 | 4/2003 | Philippe et al. |
| 2004/0074553 | A1 * | 4/2004 | Espinasse .............. F16L 11/083 138/135 |
| 2004/0154677 | A1 | 8/2004 | Coutarel |
| 2004/0182462 | A1 | 9/2004 | Glejbol et al. |
| 2004/0221907 | A1 | 11/2004 | Glejbol et al. |
| 2008/0202621 | A1 | 8/2008 | Kanao |
| 2013/0014849 | A1 | 1/2013 | Glejbol |

FOREIGN PATENT DOCUMENTS

| | | |
|---|---|---|
| CN | 1420973 | 5/2003 |
| CN | 1922428 | 2/2007 |
| CN | 200940659 Y | 8/2007 |
| CN | 102272504 | 12/2011 |
| CN | 102996922 A | 3/2013 |
| DE | 349051 | 2/1922 |
| EP | 1826468 | 8/2007 |
| EP | 2857115 | 4/2015 |
| GB | 468476 | 7/1937 |
| GB | 1081339 | 8/1967 |
| GB | 1213851 | 11/1970 |
| WO | WO 2004/005785 | 1/2004 |
| WO | WO 2004/111514 | 12/2004 |
| WO | WO 2010/064026 | 6/2010 |
| WO | WO 2011/092440 | 8/2011 |
| WO | WO 2011/141033 | 11/2011 |
| WO | WO 2012/097817 | 7/2012 |
| WO | WO 2012/131354 | 8/2012 |
| WO | WO 2013/098548 | 7/2013 |
| WO | WO 2014/000816 | 1/2014 |
| WO | WO 2014/023515 | 2/2014 |
| WO | WO 2014/023516 | 2/2014 |
| WO | WO 2014/167349 | 10/2014 |
| WO | 2015121316 † | 8/2015 |
| WO | WO 2015/121316 | 8/2015 |
| WO | WO 2015/121424 | 8/2015 |

OTHER PUBLICATIONS

Nielsen, K. G. et al. (2011) "Application of a New Wire Carcass Design for Prevention of Singing Behaviour in Flexible Risers", Offshore Technology Conference, p. 2362-2371.
Search Report for App No. PCT/GB2014/051134 dated Oct. 16, 2014, 5 pages.
Popular Science Monthly, Aug. 1937, vol. 131, No. 2 p. 19-21, 126.
Excerpt from www.offshorerisertechnology.com/overview.html.
API Specification 17J (Third Edition).
Brazilian Office Action for Application No. BR112015025999-5, 3 pages.
Search Report received in Chinese Application No. 201810234424.2 dated Jun. 22, 2019.

\* cited by examiner
† cited by third party

ELONGATE TAPE ELEMENT AND METHOD

The present invention relates to an elongate tape element and method of forming flexible pipe body. In particular, but not exclusively, the present invention relates to a tape element for use in forming a layer of a flexible pipe body.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). Flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer layers and/or composite layers and/or metallic layers. For example, a pipe body may include polymer and metal layers, or polymer and composite layers, or polymer, metal and composite layers.

In many known flexible pipe designs the pipe body includes one or more pressure resistant layers. The primary load on such layers is formed from radial forces. For example pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wired forming hoop components, the radial forces from outer or inner pressure on the pipe cause the hoop components to expand or contract, putting a tensile load on the wires.

Unbonded flexible pipe has been used for deep water (less than 3,300 feet (1,005.84 metres)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased.

Flexible pipe may also be used for shallow water applications (for example less than around 500 metres depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However, as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

Another example of a pressure resistant layer is a carcass layer which helps prevent outer pressure collapsing a fluid retaining layer in the flexible pipe body. A carcass layer is thus a collapse resistant layer in the flexible pipe body. It is known that during flow of production fluids along a flexible pipe that includes a carcass layer Flow Induced Pulsation (FLIP) can be produced by the flow as it passes along the pipe. The problem is characterised by the complex interaction between fluid flow, acoustic response and carcass inner wall geometry. At specific frequencies the flow will excite acoustic or mechanical resonances producing undesired vibration or 'singing'. These can be of such intensity that they adversely affect the fatigue life of topside and subsea attachments associated with the flexible pipe.

In addition, with certain pressure-resistant profiles, layers adjacent to the pressure armour layer may become damaged, in particular when the material of the adjacent layer moves into gaps between adjacent windings of the pressure armour layer.

In accordance with industry regulations, all flexible pipe structures must undergo a factory acceptance test (FAT) prior to sale. This involves pressurising a pipe bore with a fluid such as water at 1.5 times the usual pressure of use. The water is thus a pressurising medium.

The application of internal pressure (i.e. pressure from within the bore) to the pipe produces radial expansion in all layers and this is when a polymer layer undergoes deformation and tends to creep into the gaps of an overlying armour layer. At high pressures (about 8000 psi/55 MPa or more), the resultant strain distribution within the polymer layer can be highly localised at the areas around the gaps, and the polymer material may deform by cavitation rather than plastic flow. This can in turn result in the formation of microcrazing or microcracking on the radially inner surface of the polymer layer. During any subsequent loading (such as the loading experienced during normal use in transporting production fluids) this microcrazing may then extend to form longer/deeper cracks throughout the polymer layer. This increases the risk of failure of the polymer layer and may ultimately lead to loss of pressure containment, having an adverse effect on the lifetime of a flexible pipe.

WO98/16770, WO2009/087348, WO2010/055323, US2004/0182462, US2010/0059134, U.S. Pat. No. 6,739,355, U.S. Pat. No. 5,275,209, U.S. Pat. No. 6,192,941, U.S. Pat. No. 6,283,161, U.S. Pat. No. 6,065,501, EP1141606, EP1395769 and U.S. Pat. No. 4,549,581 disclose armour layer windings with various shaped cross-sections.

It is an aim of the present invention to at least partly mitigate the above-mentioned problems.

It is an aim of certain embodiments of the present invention to help reduce or entirely avoid FLIP.

It is an aim of certain embodiments of the present invention to provide a tape that can be manufactured without complex or costly manufacturing techniques and which can be wound to bridge gaps between windings of a flexible pipe body layer to help reduce any carcass singing effect and/or to prevent deformation by cavitation.

It is an aim of certain embodiments of the present invention to provide a method of manufacturing an elongate tape that can be wound between windings of a carcass layer or another pressure resistant layer.

According to a first aspect of the present invention there is provided an elongate tape element, for bridging a gap between windings of a flexible pipe body layer, having a cross-sectional profile comprising:
  a body portion at least partially locatable in a gap between adjacent windings of a layer of a flexible pipe;
  a first wing portion extending from the body portion to a first wing end; and
  a further wing portion extending from the body portion to a further wing end; wherein
  the elongate tape element has a substantially uniform thickness across the cross-sectional profile.

Aptly each wing portion comprises a substantially flat inner surface region.

Aptly a wingspan between the first wing end and the further wing end is larger than a maximum possible width of the gap.

Aptly the body portion is at least partially locatable in a gap between edges of adjacent windings that each have a curved surface.

Aptly the body portion is at least partially locatable between adjacent windings of a collapse resistant layer.

Aptly the elongate tape element is a relatively fine elongate tape.

Aptly the elongate tape element is helically windable between successive windings that provide said adjacent windings of a layer of a flexible pipe.

Aptly the first and further wing portions each extend from an end region of the body portion.

Aptly an outer surface region of each of the first and further wing portions is locatable to abut with an inner surface region of the adjacent windings.

Aptly the cross-sectional profile is approximately T-shaped.

Aptly the body portion has an approximately U-shaped profile.

Aptly the body portion has a first side portion and a further side portion.

Aptly the body portion has a base portion between the first side portion and the further side portion.

Aptly the substantially uniform thickness of the cross-section comprises tapered away wing portions that have a surface region that is tapered.

Aptly the elongate tape element is manufactured from a material that is a metal or aluminium alloy or non-metal or a polymer or an elastomer or a rubber or a foam or a combination of said materials.

Aptly the elongate tape element comprises a coating.

Aptly the coating provides corrosion protection and/or wear resistance and/or a low coefficient of friction.

Aptly the first wing end comprises a first long edge of the tape element and the further wing end comprises a further long edge of the tape element.

Aptly the cross-sectional profile only comprises:
  the first wing portion that extends from the first wing end at a long edge of the tape element to the body portion via a first substantially linear intermediate portion;
  the body portion which comprises a folded central portion of the profile; and
  the further wing portion that extends from the further wing end at a further long edge of the tape element to the body portion via a further, substantially linear, intermediate portion.

Aptly the first wing portion further comprises a first wing tip region between the first wing end and the first intermediate portion; and the further wing portion further comprises a further wing tip region between the further wing end and the further intermediate portion.

Aptly each wing tip region is folded down into a dipped position via a respective fold line to incline the wing tip region with respect to an adjacent intermediate region of a respective wing portion, Aptly each wing tip region is tapered at a respective wing end.

According to a second aspect of the present invention there is provided a method of manufacturing an elongate tape element for bridging a gap between windings of a flexible pipe body layer, comprising the steps of:
  providing an elongate sheet, having a uniform thickness and a first and further spaced apart long edge, to a first pair of a plurality of spaced apart pairs of opposed forming roller elements; and
  via the pairs of rollers, progressively forming a cross-sectional profile in the sheet that comprises a body portion comprising a folded central region of the sheet and at least one wing portion that each extend away from the body portion and terminate at a respective long edge of the sheet.

Aptly the method further comprises providing the sheet as a flat sheet at the first pair of forming rollers.

Aptly the method further comprises, via the first pair of forming rollers, providing a cross-sectional profile in the sheet that comprises an inset central region and upturned wing portions each extending from a respective folded region adjacent to the inset central region.

Aptly the method further comprises, via a further pair of forming rollers, folding down the wing portions of the sheet towards a base of the body portion thereby providing a cross-sectional profile comprising a pair of wing portions that are substantially parallel and that extend in opposed directions from the inset central region.

Aptly the method further comprises, via a still further pair of opposed forming rollers, folding down and/or tapering by shaving or compressing wing tip regions proximate to respective long edges of the sheet, thereby providing a cross-sectional profile that comprises a dipped and/or tapered first wing tip region extending from a first long edge of the sheet, an intermediate region of a first wing portion, a body portion comprising a central inset region, a further intermediate region of a further wing portion and a further dipped and/or tapered wing tip region extending from the further intermediate region to a further long edge of the sheet.

Aptly the method further comprises, via at least one pair of rollers, forming dipped wing tips and/or tapered wing tip regions proximate to respective long edges of the sheet.

Aptly the method further comprises, via the pairs of rollers, progressively forming a cross-sectional profile that only comprises:
  a central body portion comprising an inset region;
  a first wing portion extending from a first edge of the body portion to a respective long edge; and
  a further wing portion extending from a further edge of the body portion to a remaining long edge of the sheet.

According to a third aspect of the present invention there is provided a method of manufacturing flexible pipe body, comprising the steps of:
  winding a carcass tape helically around a cylindrical outer surface of a mandrel at a carcass layer forming station; and simultaneously winding an elongate tape element having a cross sectional profile that has a substantially uniform thickness, between adjacent windings of the carcass tape; thereby locating a body portion of the elongate tape at least partially in a gap between adjacent carcass tape windings and bridging the gap via at least one wing portion of the elongate tape element.

Aptly the method further comprises winding the elongate tape element on the mandrel immediately subsequent to a preceding winding of the carcass tape; and subsequently winding a next winding of the carcass layer adjacent to the winding of the elongate tape element.

Aptly the method further comprises urging adjacent windings of the carcass layer into an interlocked relationship; and locating a body portion of the elongate element between curved regions of the carcass winding.

Aptly the method further comprises winding the elongate tape element whereby a radially inner surface of each wing portion is located proximate to said cylindrical outer surface and the body portion of the elongate tape element extends radially outwardly away from the outer surface.

Aptly the method further comprises supporting the carcass tape and elongate tape as they are wound via respective guide rollers that each comprise a respective guide profile.

Aptly the method further comprises providing the elongate tape element at the carcass forming station by forming the elongate tape element from a flat sheet via a plurality of pairs of opposed forming rollers of the carcass forming station.

Aptly the method further comprises providing the elongate tape element at the carcass forming station by transporting a pre-formed tape element having a substantially uniform thickness and a body portion and at least one wing portion to the carcass forming station.

Aptly the method comprises forming crinkles or up-stand regions in the body portion.

Aptly the crinkle regions are provided by the step of passing the body portion along a curved pathway between offset body forming rollers.

Aptly the body forming rollers have a frusto conical forming surface.

Aptly the up-stand regions are provided by cutting out gaps in the body portion at selected intervals.

According to a fourth aspect of the present invention there is provided an elongate tape element, for bridging a gap between windings of a flexible pipe body layer, having a cross-sectional profile comprising:

a body portion at least partially locatable in a gap between adjacent windings of a layer of a flexible pipe; and at least a first wing portion extending from the body portion to a first wing end; wherein the elongate tape element has a substantially uniform thickness across the cross-sectional profile.

Aptly the tape further comprises a further wing portion extending from the body portion to a further wing end.

According to a fifth aspect of the present invention there is provided an elongate tape element, for bridging a gap between windings of a flexible pipe body layer, having a cross-sectional profile comprising:

a body portion at least partially locatable in a gap between adjacent windings of a layer of a flexible pipe; and at least a first wing portion extending from the body portion to a first wing end; wherein the body portion is crinkled or includes up-stand regions for easing formation of the elongate tape around an underlying cylindrical surface.

Aptly the tape element further comprises a further wing portion extending from the body portion to a further wing end.

According to a sixth aspect of the present invention there is provided apparatus for helically winding over an underlayer comprising at least one elongate tape element having a cross-sectional profile that comprises a body portion that is crinkled and/or comprises up-stand regions along at least a portion of a length of the tape element.

Aptly the body portion is crinkled and/or comprises up-stand regions along a whole length of the tape element.

Aptly the cross-sectional profile further comprises at least a first wing portion extending from an end of the body portion.

According to a seventh aspect of the present invention there is provided apparatus constructed and arranged substantially as herein before described with reference to the accompanying drawings.

According to a eighth aspect of the present invention there is provided a method substantially as herein before described with reference to the accompanying drawings.

Certain embodiments of the invention provide the advantage that tape elements may be helically wound to form windings of an armour layer, such that layers beneath (radially inwards) the armour layer are not subject to large variations in contact stress and strain in the layers.

Certain embodiments of the invention provide the advantage that abrupt strain variation in an adjacent polymer barrier layer or liner is reduced or prevented.

Certain embodiments of the invention provide a bridging element for winding between armour wires to form an armour layer. A flexible pipe body can be produced having an armour layer and a radially inner polymer barrier layer or liner. With such a bridging element, the contact stresses between the polymer layer and the armour layer are substantially uniform.

Certain embodiments of the invention provide the advantage that a flexible pipe body is provided that has improved performance and lifetime span. In particular, the possibility of burst-through of a fluid retaining layer is averted.

Certain embodiments of the invention provide an elongate tape that can be wound between windings of a collapse resistant layer to bridge gaps between adjacent windings.

Certain embodiments of the invention enable gaps between adjacent windings on a radially inner side of a carcass layer to be bridged by a wound tape to help entirely avoid or at least partly reduce vortex shedding during flow of production fluids.

Certain embodiments of the invention provide a method of forming a tape, that can be used to reduce singing caused by a carcass layer, using a relatively cheap starting sheet and forming the sheet using a very small number of forming steps so that manufacturing steps and thus costs can be kept to a minimum. Optionally the bridging element can be manufactured 'on site' as the flexible pipe is manufactured or can be pre-constructed and stored in a coiled format for subsequent use.

Certain embodiments of the invention provide a bridging tape that is always kept in contact with a collapse resistant layer to avoid separation and thus pipe failure in use.

Certain embodiments of the present invention provide a bridging element which can be manufactured with a cross-sectional shape that does not risk the creation of stress cracking in the material of the tape during manufacture. Such cracking might otherwise cause failure in use.

Figure 2:
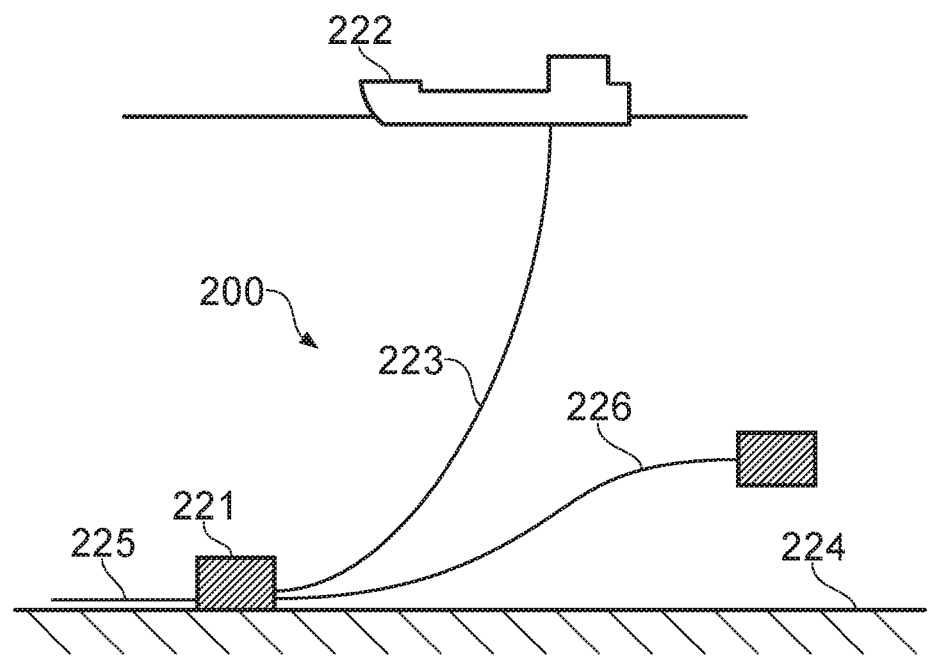
Figure 3:
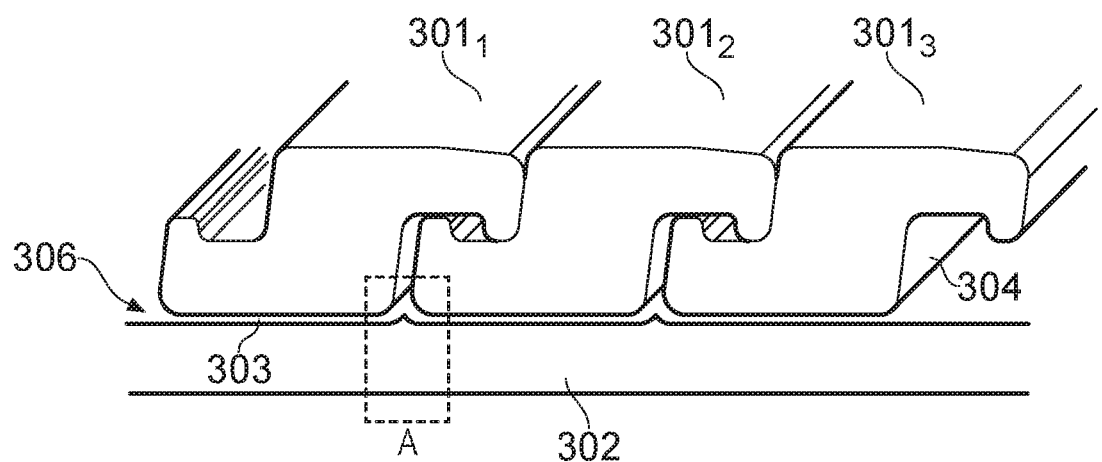
Figure 4:
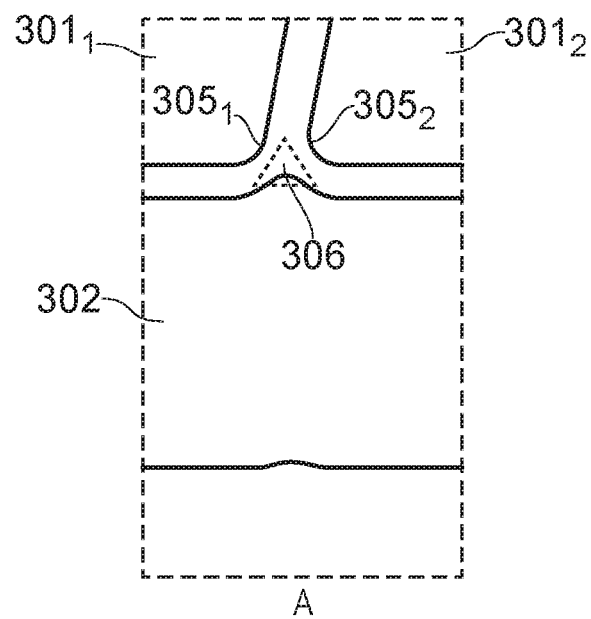
Figure 5:
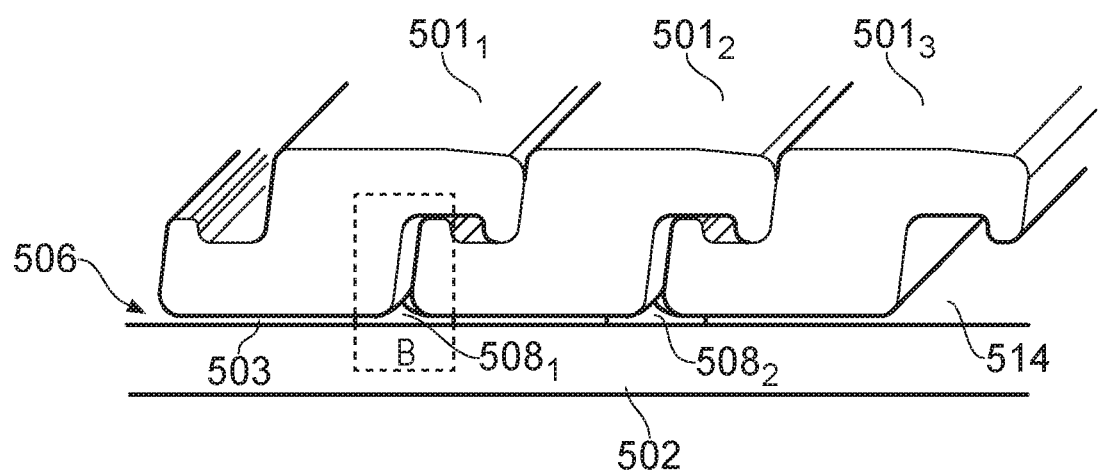
Figure 7:
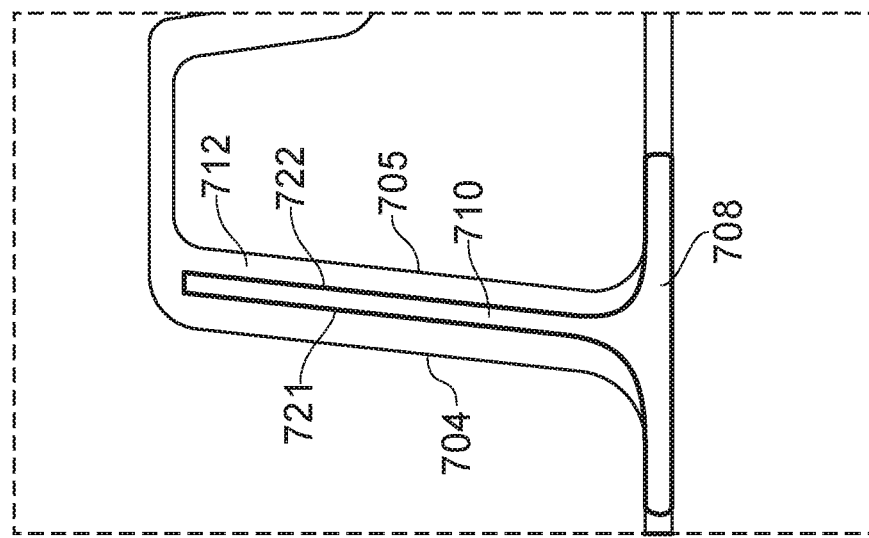
Figure 6:
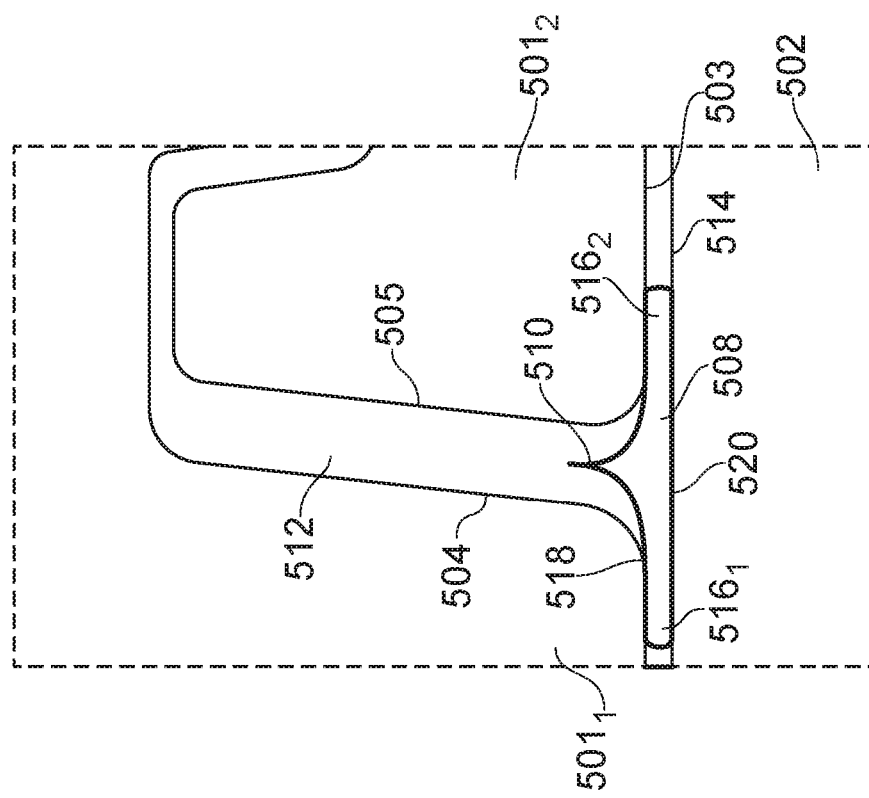
Figure 9:
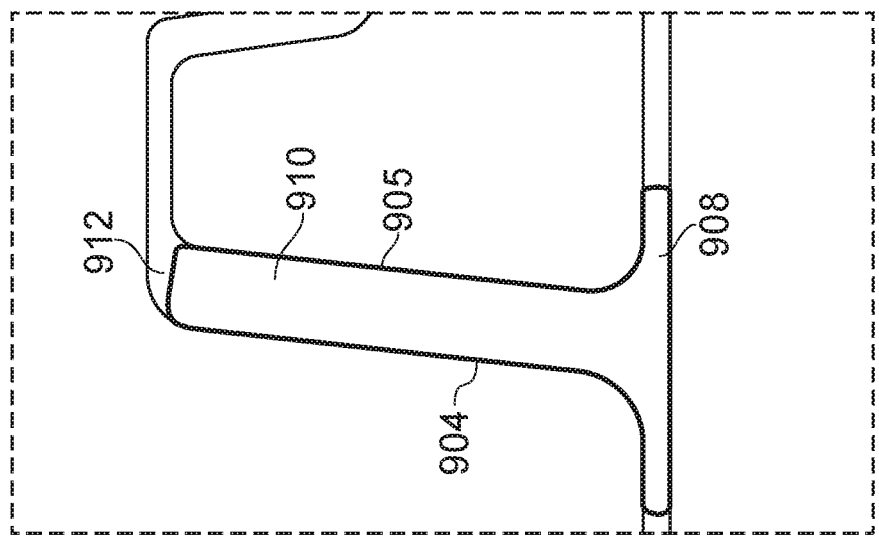
Figure 8:
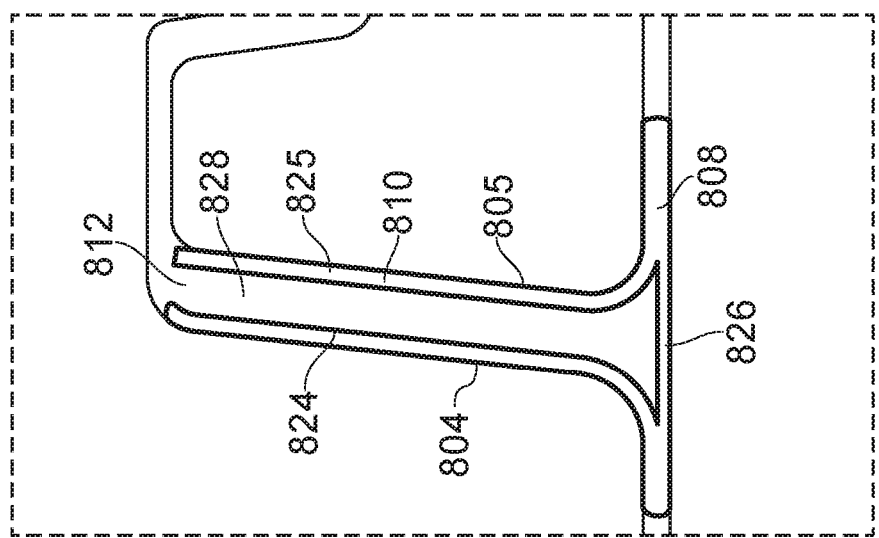
Figure 10A:
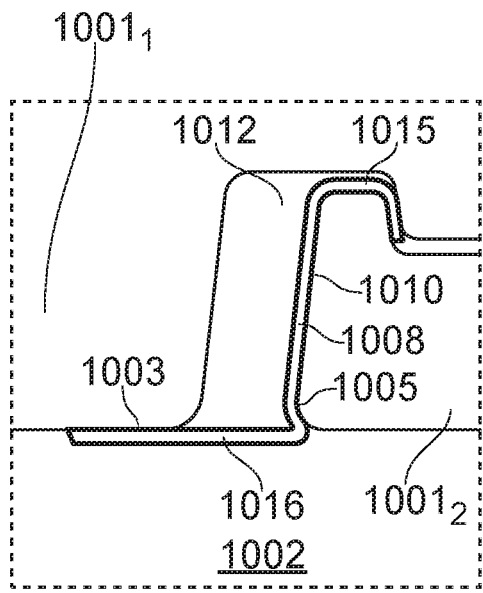
Figure 10B:
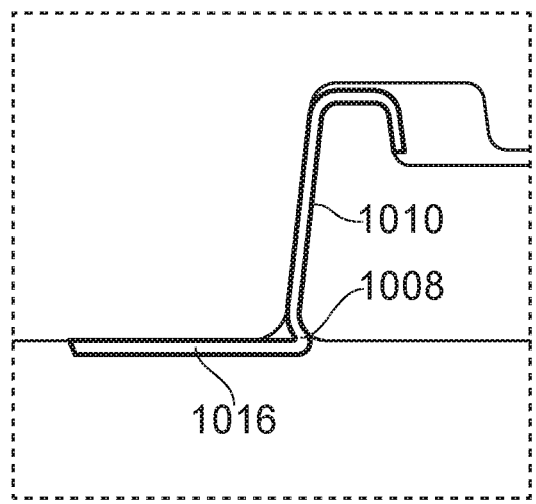
Figure 11A:
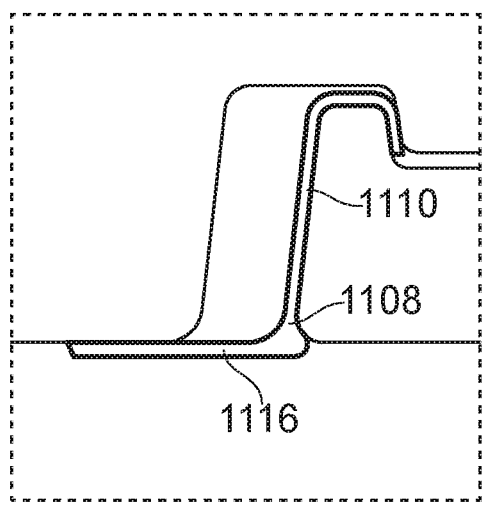
Figure 11B:
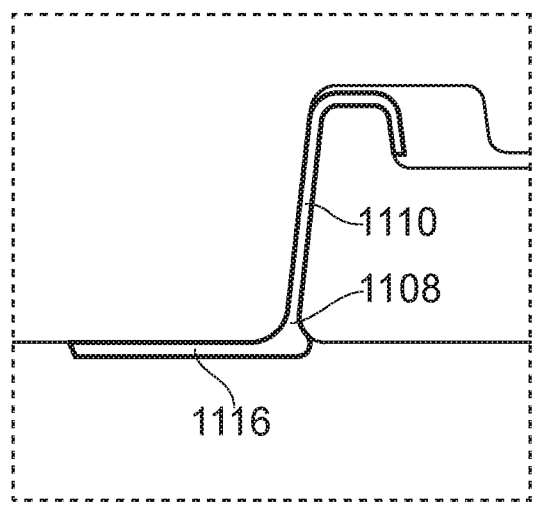
Figure 10C:
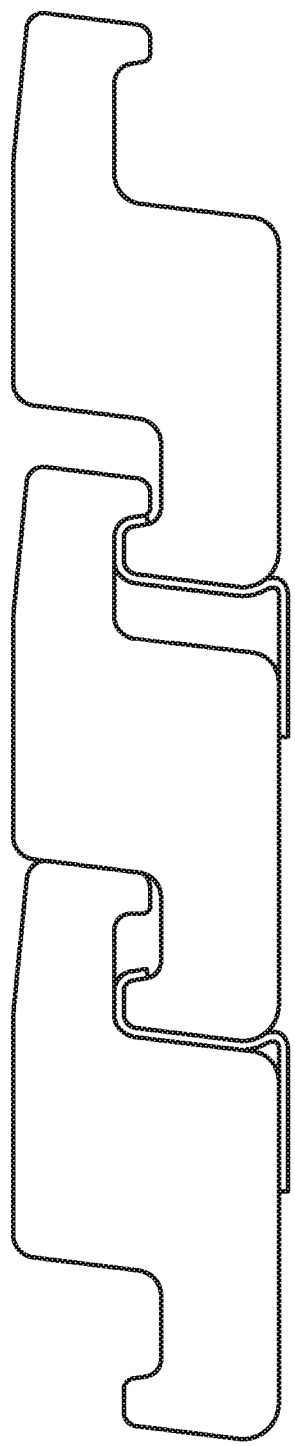
Figure 11C:
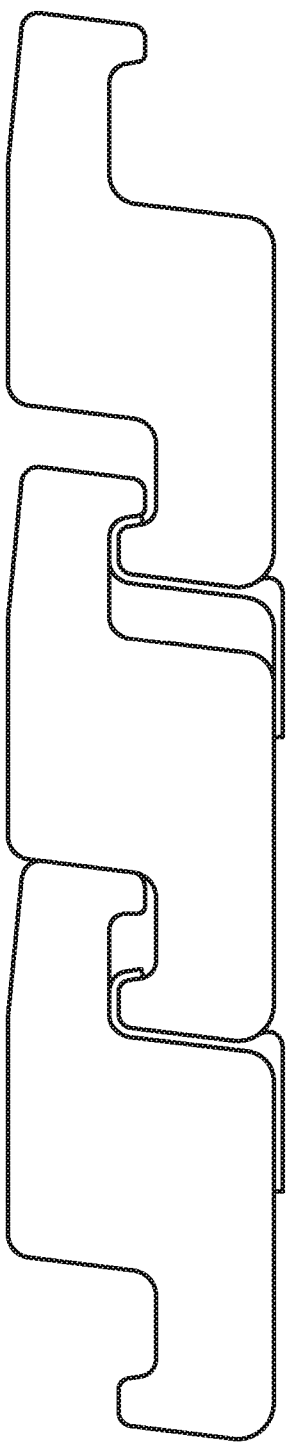
Figure 12A:
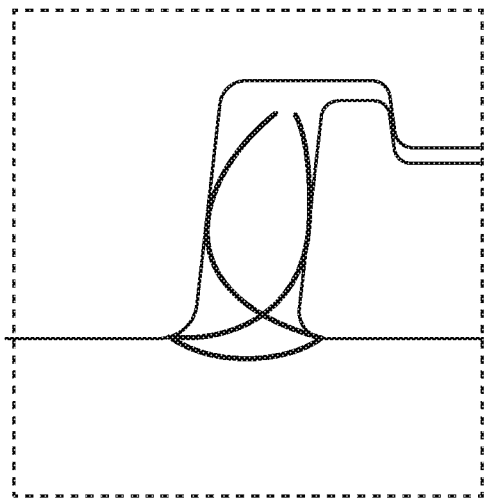
Figure 12B:
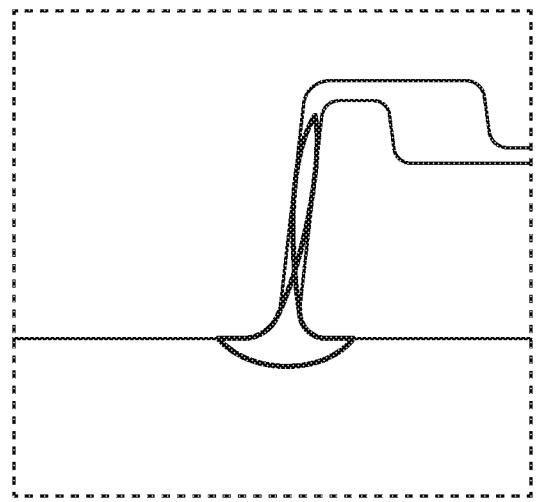
Figure 13A:
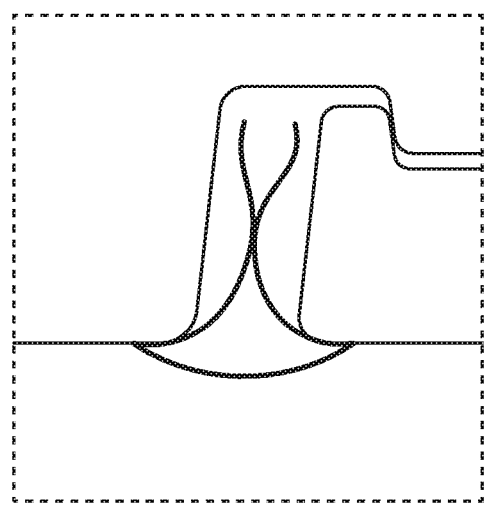
Figure 13B:
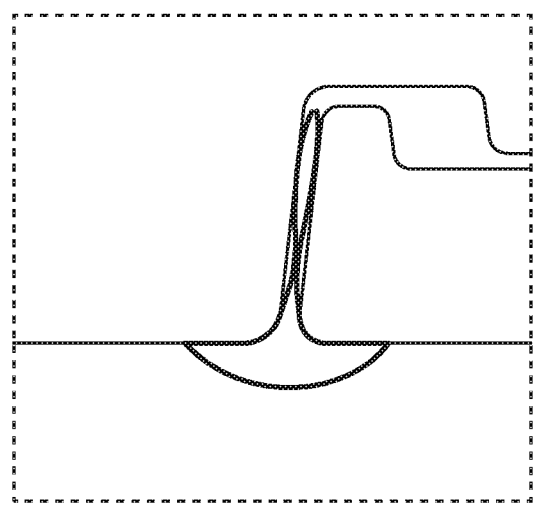
Figure 12C:
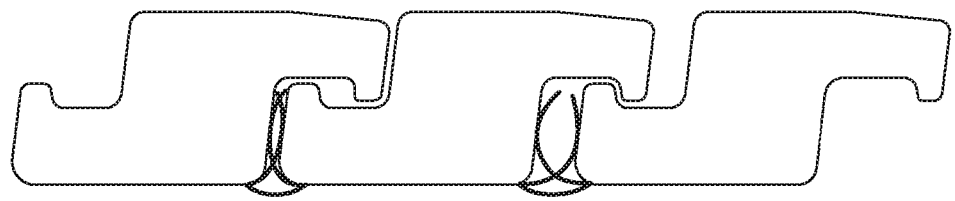
Figure 13C:
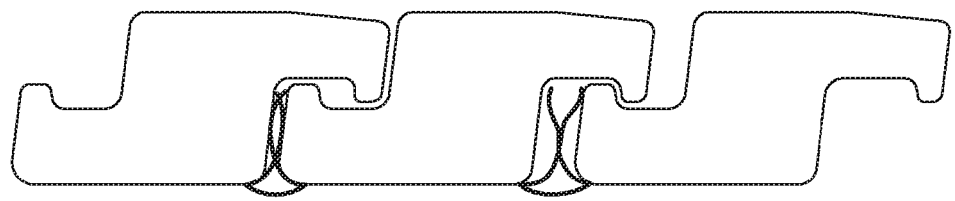
Figure 14:
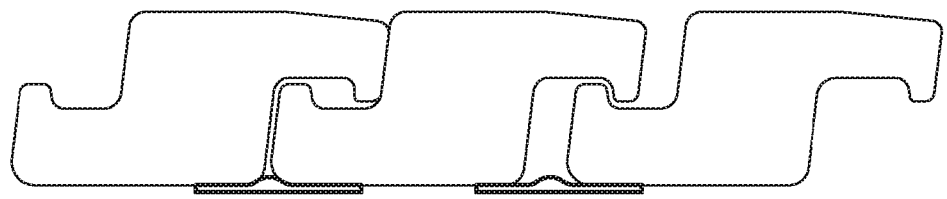
Figure 15A:
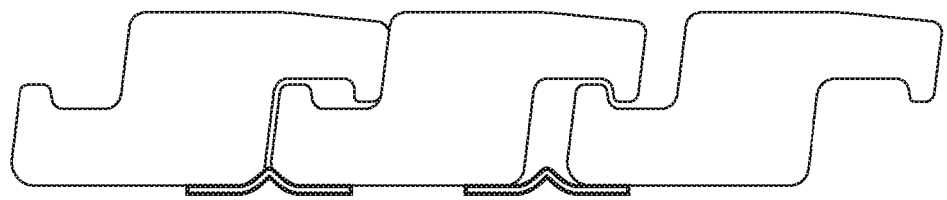
Figure 15B:
Figure 16A:
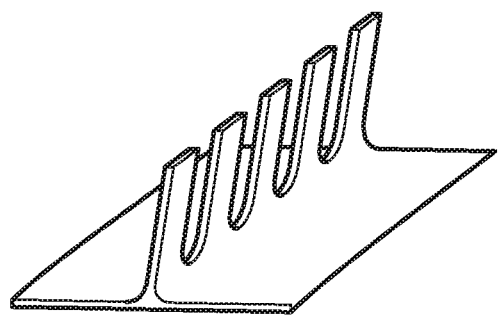
Figure 16B:
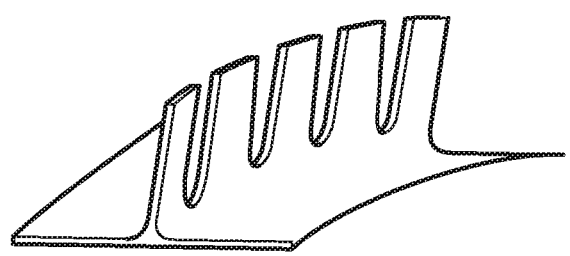
Figure 17A:
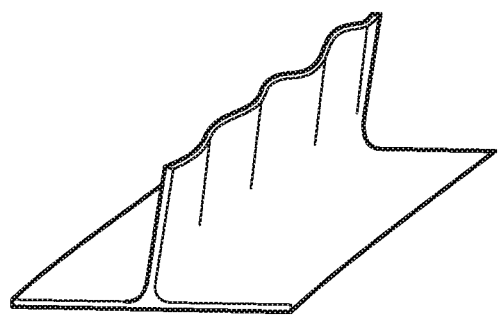
Figure 17B:
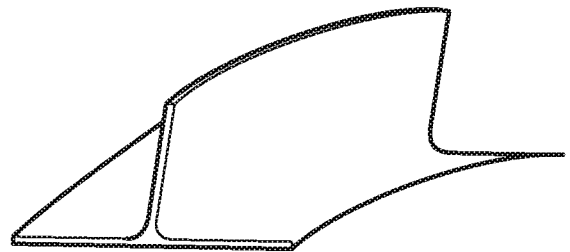
Figure 18:
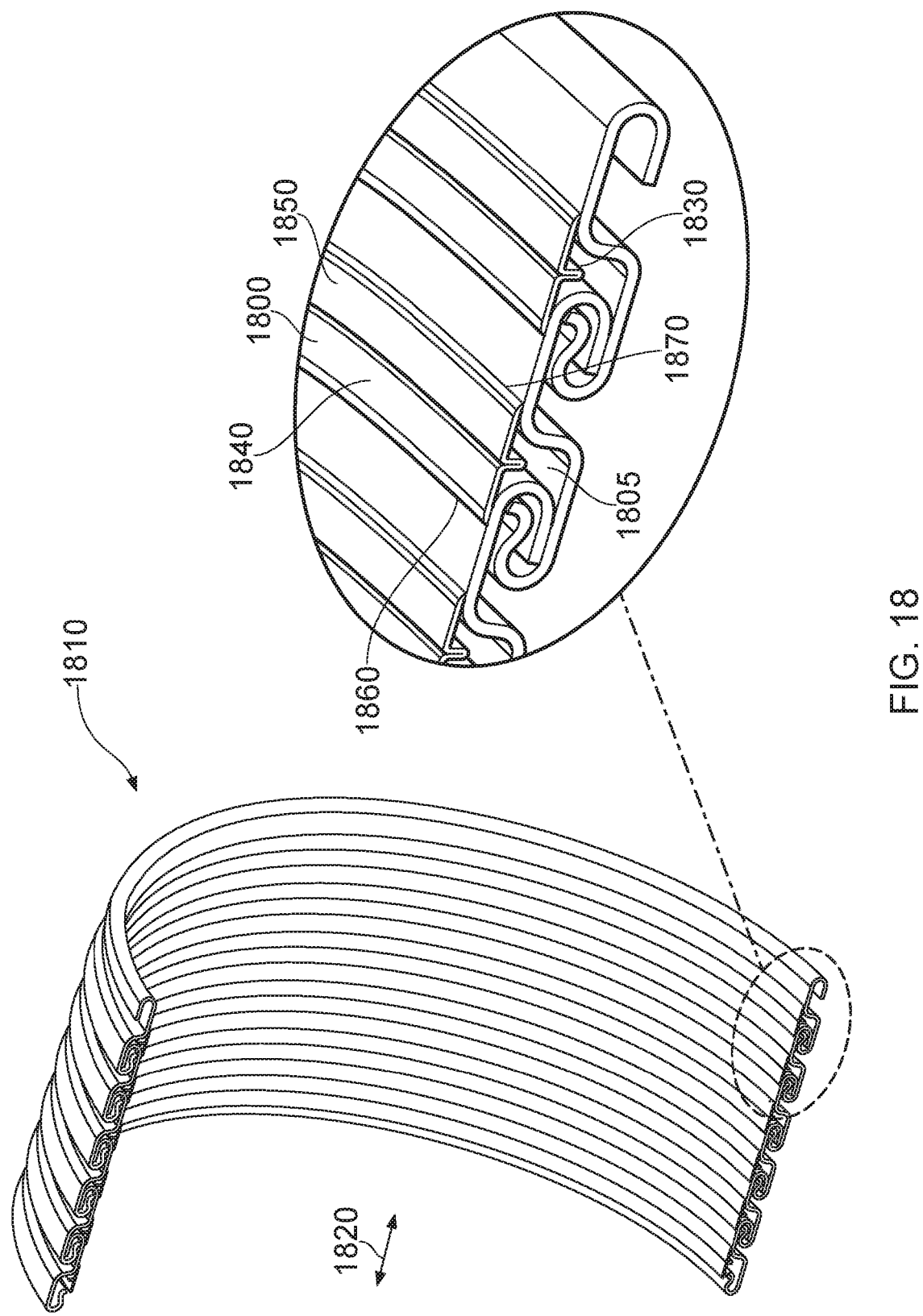
Figure 19:
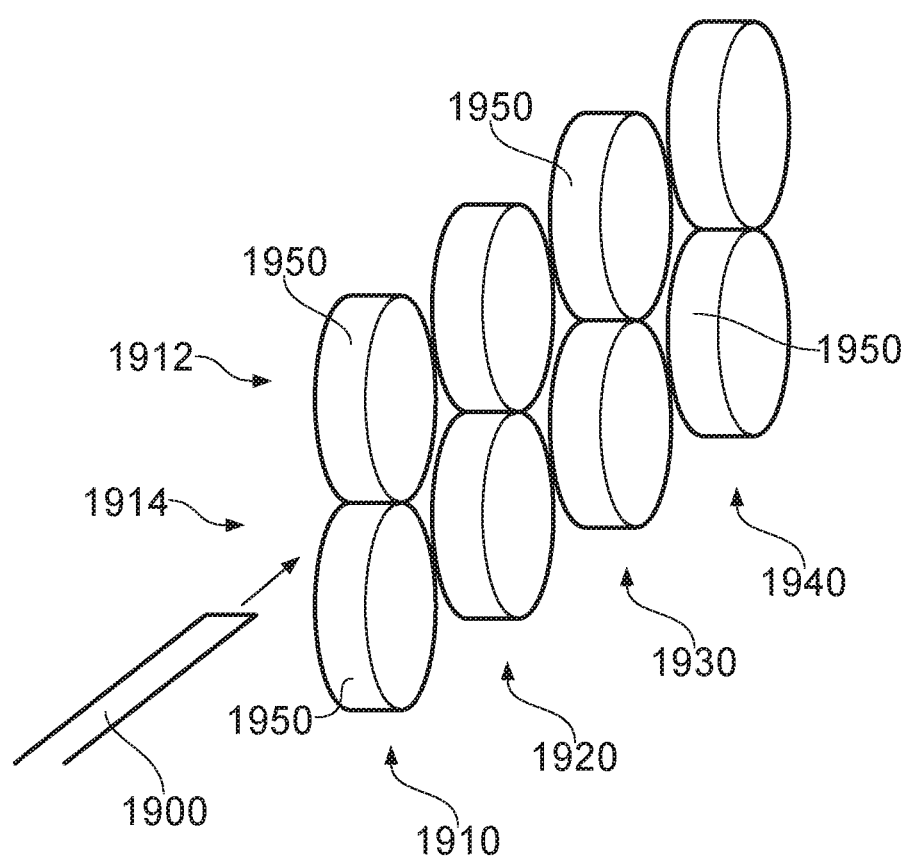
Figure 21:
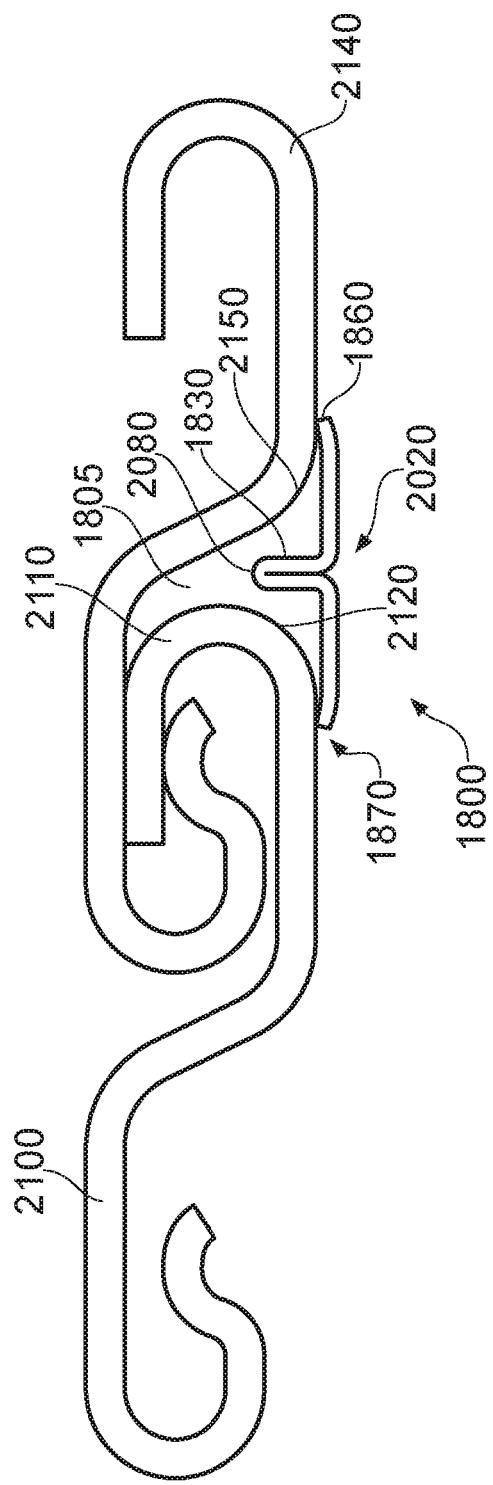
Figure 22:
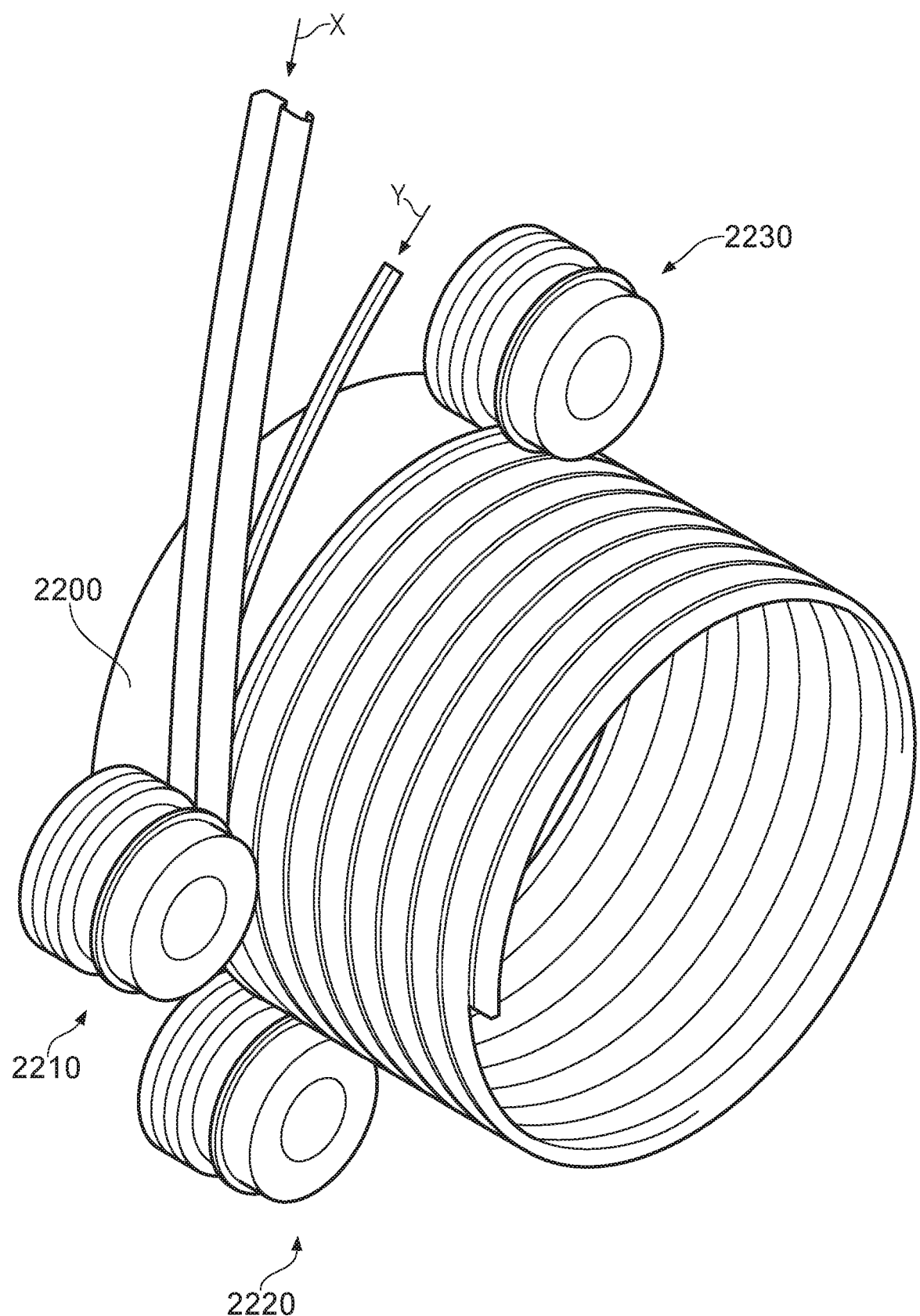
Figure 23:
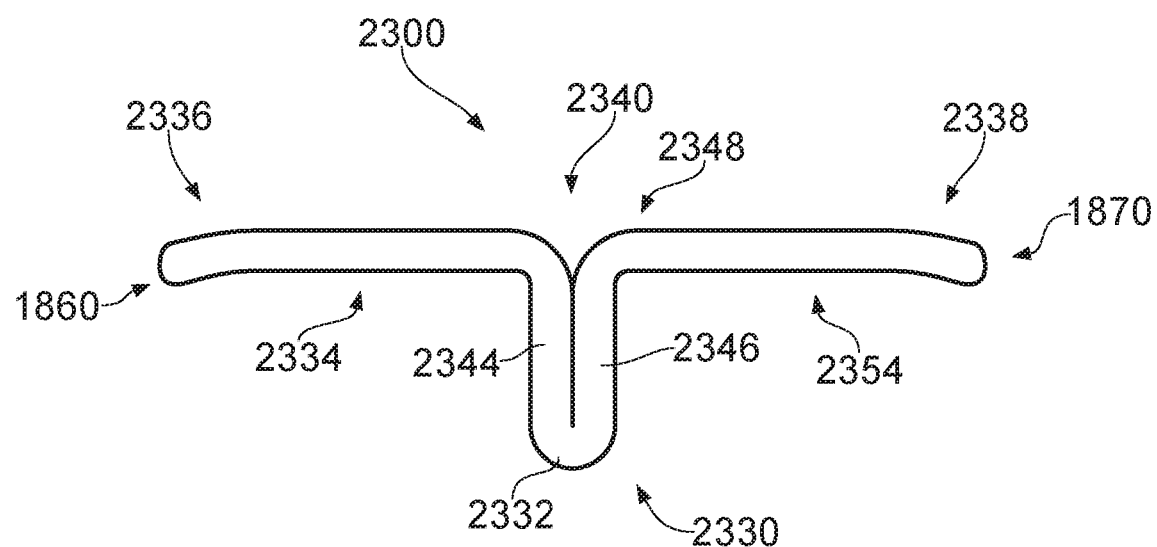
Figure 24:
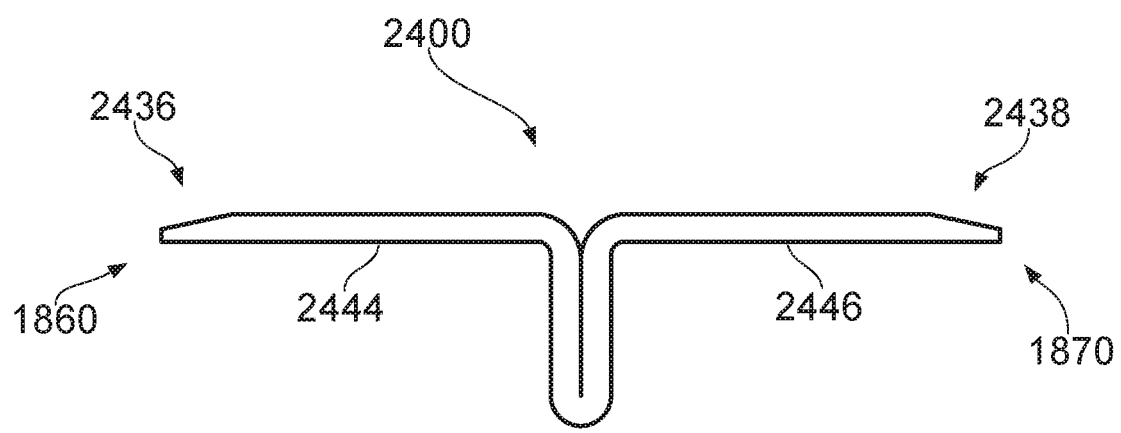
Figure 25:
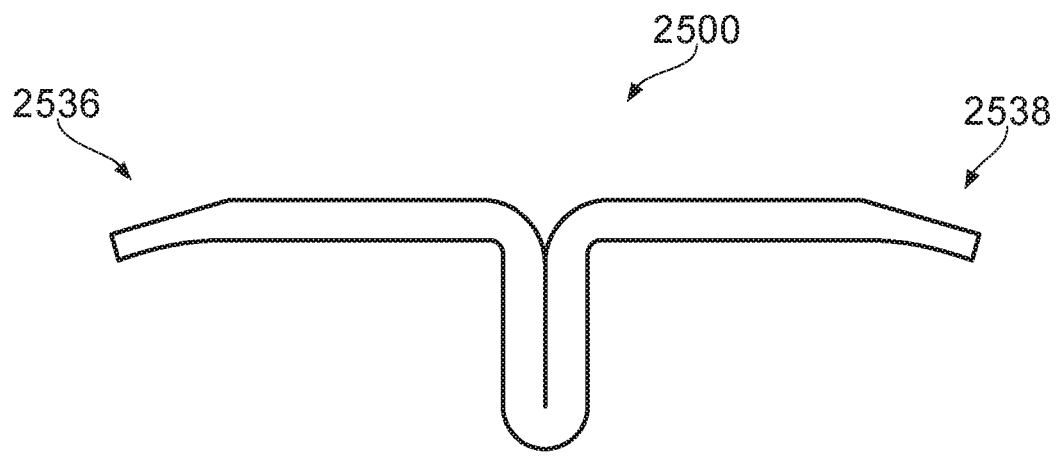
Figure 26:
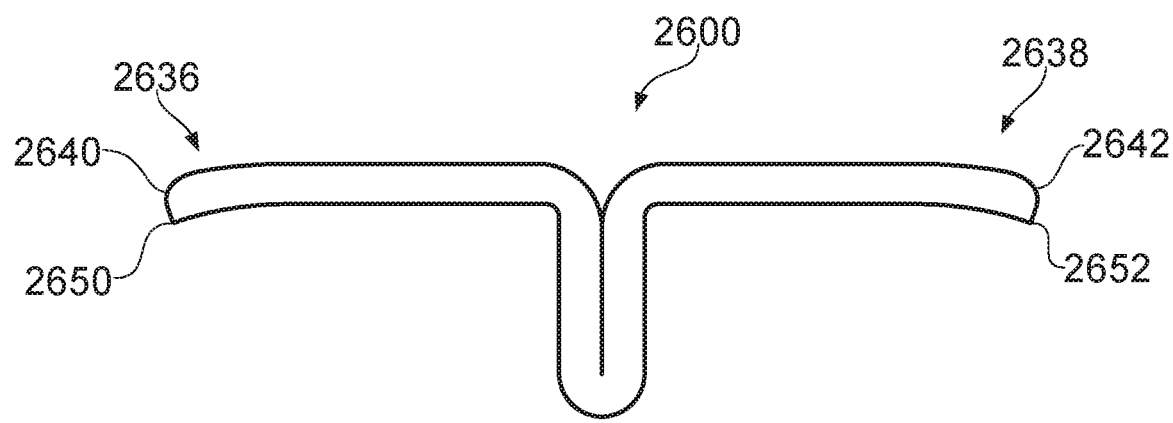
Figure 27:
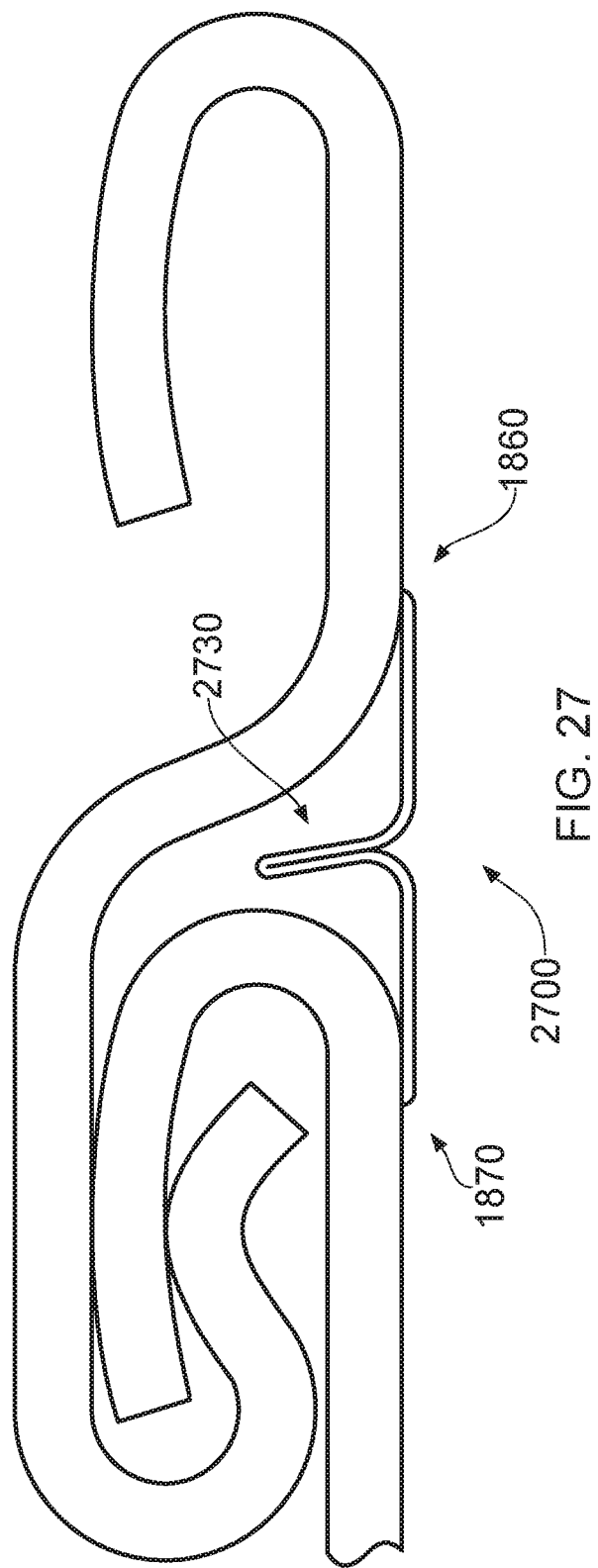
Figure 29:
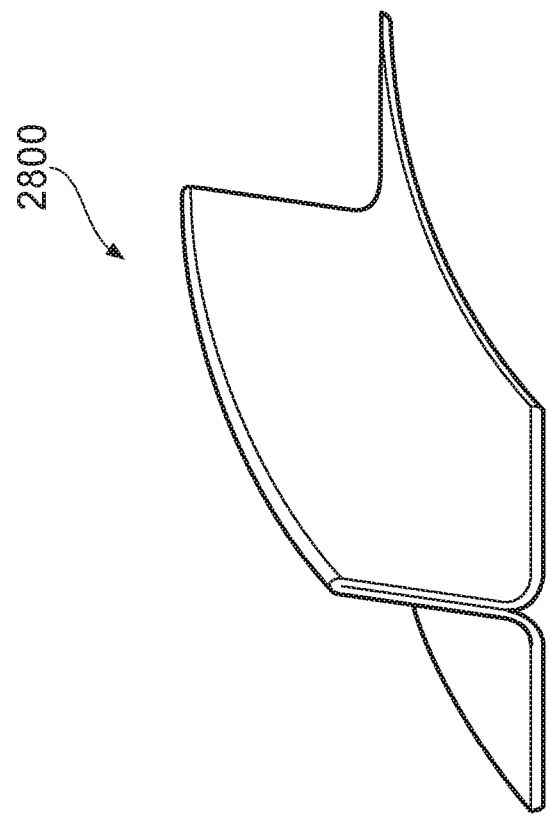
Figure 28:
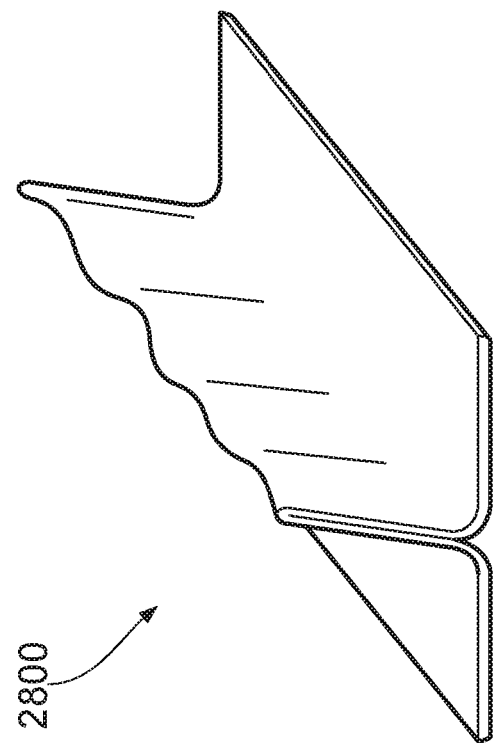

Embodiments of the invention are further described hereinafter with reference to the accompanying drawings, in which:

FIG. 1 illustrates flexible pipe body;
FIG. 2 illustrates a riser assembly;
FIG. 3 illustrates a portion of flexible pipe body;
FIG. 4 illustrates an enlarged view of the section A shown in FIG. 3;
FIG. 5 illustrates a portion of flexible pipe;
FIG. 6 illustrates an enlarged view of the section B shown in FIG. 5;
FIG. 7 illustrates an alternative bridging element;
FIG. 8 illustrates an alternative bridging element;
FIG. 9 illustrates an alternative bridging element;
FIGS. 10a, 10b and 10c illustrate an alternative bridging element;
FIGS. 11a, 11b and 11c illustrate an alternative bridging element;
FIGS. 12a, 12b and 12c illustrate an alternative bridging element;
FIGS. 13a, 13b and 13c illustrate an alternative bridging element;
FIG. 14 illustrates an alternative bridging element;
FIGS. 15a and 15b illustrate an alternative bridging element;
FIGS. 16a and 16b illustrate an alternative bridging element;
FIGS. 17a and 17b illustrate an alternative bridging element;
FIG. 18 illustrates an alternative bridging element;
FIG. 19 illustrates a method of manufacturing the bridging element illustrated in FIG. 18;
FIGS. 20a, 20b, 20c and 20d illustrate a method of manufacturing an elongate tape;
FIG. 21 illustrates providing a bridging element between adjacent windings on a radially inner side of a carcass layer;
FIG. 22 illustrates a method of winding tapes to form a carcass layer;
FIG. 23 illustrates an alternative cross-sectional profile of a bridging element;
FIG. 24 illustrates an alternative cross-sectional profile of a bridging element;
FIG. 25 illustrates an alternative cross-sectional profile of a bridging element;
FIG. 26 illustrates an alternative cross-sectional profile of a bridging element;
FIG. 27 illustrates an alternative bridging element having a deeper body portion between adjacent windings of a carcass layer;
FIG. 28 illustrates a bridging element having a crinkled body portion; and
FIG. 29 illustrates the bridging element illustrated in FIG. 28 wound over an arcuate surface.

In the drawings like reference numerals refer to like parts.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, pipe body includes an innermost carcass layer 101. The carcass is a pressure resistant layer that provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from composite, polymer, or other material, or a combination of materials.

The internal pressure sheath 102 acts as a fluid retaining layer and comprises a polymer layer that ensures internal fluid integrity. It is to be understood that this layer may itself comprise a number of sub-layers. It will be appreciated that when the carcass layer is utilised the internal pressure sheath is often referred to by those skilled in the art as a barrier layer. In operation without such a carcass (so-called smooth bore operation) the internal pressure sheath may be referred to as a liner.

A pressure armour layer 103 is a pressure resistant layer that provides a structural layer that increases the resistance of the flexible pipe to internal and external pressure and mechanical crushing loads. The layer also structurally supports the internal pressure sheath, and typically consists of an interlocked construction of wires with a lay angle close to 90°. Aptly the pressure armour layer is a metallic layer. Aptly the pressure armour layer is formed from carbon steel, aluminium alloy or the like. Aptly the pressure armour layer is formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs. Aptly the tensile armour layers are metallic layers. Aptly the tensile armour layers are formed from carbon steel, aluminium alloy or the like. Aptly the tensile armour layers are formed from composite, polymer, or other material, or a combination of materials.

The flexible pipe body shown also includes optional layers of tape 104 which help contain underlying layers and to some extent prevent abrasion between adjacent layers. The tape layer may optionally be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line. The flexible flow line 225 comprises a flexible pipe, wholly or in part, resting on the sea floor 224 or buried below the sea floor and used in a static application. The floating facility may be provided by a platform and/or buoy or, as illustrated in FIG. 2, a ship. The riser assembly 200 is provided as a flexible riser, that is to say a flexible pipe 223 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 225 or jumper 226.

FIG. 3 illustrates a portion of a known flexible pipe body including windings $301_{1-3}$ of a pressure armour layer and a radially inner polymer fluid retaining layer 302. FIG. 4 shows an enlarged view of section A of FIG. 3. As a tape is wound to form the pressure armour layer, an inner surface 303 of the pressure armour layer is formed from one edge of the tape profile by the repeated, adjacent windings. Of course, a single tape may be wound as a repeated winding (as shown in FIG. 3), or several tapes, possibly of different profiles, may be successively wound, with one edge of each tape profile forming the inner surface of the armour layer. Either way, a base contact surface of each profile forms an inner surface 303 of the armour layer.

In the regions where successive windings come together, along the length of the edges 304 of each winding, it is usually the case that the edge of the tape profile forming the inner (base) surface curves away from the base towards each side wall of the tape profile at a small, constant radius of curvature $305_1$. Similarly, an adjacent winding will also curve away from the inner surface towards a side wall at a small, constant radius of curvature $305_2$. This leaves a very approximate triangle shape of space 306 between the adjoining windings and the adjacent, radially inner layer, e.g. the polymer barrier layer 302. In this region 306, it has been found that the underlying layers, e.g. polymer barrier layer 302 and/or intermediate polymer sacrificial layer (not shown), may creep into these triangles of space. This is because the high internal pressure from fluids conveyed through the pipe force the radially inner layers towards the pressure armour layer and into the spaces between the windings. This causes localised regions where part of the polymer layer is in contact with the base of the pressure armour layer and part of the polymer that is unsupported and forced into the gap between windings. In this localised region where the windings come together, the abrupt change in support to the layers underlying the pressure armour layer causes high shear and strain to the material of those underlying layers. This may result in cracking or micro-crazing.

In flexible pipes the layers underlying the pressure armour layer are often polymer layers, for example PVDF (polyvinylidene fluoride) although it will be appreciated that many materials may be suitable, e.g. polymers, metals, or composites. A suitable material may be chosen by the pipe designer to match the conditions of use of the pipe. However, most materials will have a certain maximum allowable strain above which the risk of damage to the material is much greater. As such, the presence of the above-described gaps between windings of a pressure armour layer can lead to potential damage and potential failure in the underlying layers. When an area of polymer is under strain, the properties of that area may be changed such that it becomes weaker. In areas of strain, the polymer is more easily deformed than the surrounding material, causing an even higher level of strain in the polymer, which can result in a plastic hinge effect.

As can be seen in FIGS. 3 and 4, there is a gap extending between each winding $301_{1-3}$ of the pressure armour layer, e.g. between the opposing facing surfaces of winding $301_1$ and $301_2$. This gap may typically be between around 0 and 3 mm, for example, in a pressure armour layer. As is known in the art this gap allows the windings to move together or further apart to accommodate bending or movement of the pipe.

FIG. 5 illustrates a portion of a flexible pipe body including an elongate tape element. The flexible pipe body includes windings $501_{1-3}$ of a pressure armour layer, a radially inner fluid retaining layer 502 and an elongate tape element (bridging element) $508_{1,2}$ located in a space 506 between edges 504, 505 of adjacent windings 501 and between an inner surface 503 of the pressure armour layer and a radially outer surface 514 of the fluid retaining layer 502. FIG. 6 shows an enlarged view of section B of FIG. 5. Here, the bridging element $508_{1,2}$ is a continuous, relatively fine, metallic, elongate tape and is helically wound over the fluid retaining layer 502 between each successive winding of pressure armour tape (collapse resistant tape). That is, the bridging element is configured to be alternately wound with the pressure armour tape such that in cross section, windings of the bridging element alternate with windings of the pressure armour tape. Aptly the elastic modulus of the metallic material of the bridging element could be 170-210 GPa. Aptly the elastic modulus of the metallic material could be 190-210 GPa. The bridging element $508_{1,2}$ may alternatively be of a relatively high elastic modulus polymeric or composite material. Such relatively high elastic modulus polymers could include PVDF materials with an elastic modulus greater than 400 MPa when measured at room temperature. Aptly the elastic modulus of the polymer material could be greater than 800 MPa. Aptly the elastic modulus of the polymer material could be greater than 1000 MPa. Aptly the elastic modulus of the composite material could be 20-50 GPa. Aptly the elastic modulus of the composite material could be 70 to 80 GPa.

As can be seen in FIG. 5, the cross section profile of the pressure armour tape 501 is substantially Z shaped with a rectangular main body and a leading edge and a trailing edge. Of course the pressure armour tape, or armour tape may have other cross sectional profiles, e.g. C clip, I shaped, T shaped, X shaped or K shaped. With other profiles, the bridging element can be configured appropriately to bridge a gap between adjacent windings.

The cross section of the elongate tape 508 is approximately rectangular with a protrusion or body portion 510 extending radially outwards into at least a portion of the gap 512 between the edges 504, 505 of adjacent windings 501. It can be seen from FIG. 5 that the elongate tape has an approximately inverted T shaped cross sectional profile. The bridging element 508 is arranged to extend at least partially across the gap 512 and between the inner surface 503 of the pressure armour layer and the outer surface 514 of the adjacent fluid retaining layer 502 such that the fluid retaining layer 502 is prevented from creeping into the gap 512.

The body portion 510 of the bridging element 508 is configured to be located in the gap 512 between adjacent collapse resistant tape windings 501. The body portion extends radially outwards along the gap 512 to thereby help to maintain the position of the elongate tape 508 within the gap and maintaining the alternating winding configuration. Alternatively, the body portion 510 may be configured to have regular slits or slots along its length in order to allow the strip to bend more easily and form more consistently around the fluid retaining layer 502 (as shown in FIGS. 16a and 16b).

The bridging element 508 also includes two wing portions $516_{1,2}$, extending from an end region of the body portion 510, that span the width of the gap 512 and extend axially beyond the gap such that the radially outer surface 518 of the wing portions $516_{1,2}$ abuts the radially inner surface 503 of the adjacent collapse resistant tape windings 501. A substantially flat radially inner surface 520 of the wing portions $516_{1,2}$ abuts with the radially outer surface 514 of the fluid retaining layer 502. In this way the fluid retaining layer is prevented from creeping into the gap 512 when it is subject to internal pressure. The wing portions are designed to be relatively thin so as to not interfere greatly with the distance between the polymer barrier layer 502 and the pressure armour layer 501, yet strong enough to retain their position and prevent ingress of polymer into the gap 512.

In FIG. 5 an optional transitional curved surface between respective wing portions and the body portion is configured such that the surface has a radius of curvature approximately equal to that of a curved corner between the radially inner surface 503 and the respective side walls 504, 505 of the collapse resistant tape windings 501.

It will be appreciated that in use, a flexible pipe body is subject to bending forces with currents, vessel movement and the like. As the flexible pipe body bends, the width of the gap 512 between adjacent windings of collapse resistant tape will change. At the outer radius of a bend the gap width will generally increase, while at the inner radius of the bend, the gap width will generally decrease. It is therefore preferable for the wing span of the wing portions (i.e. the full width of the two wing portions from the outermost end of a first wing to the outermost end of a second wing) to be larger than the maximum possible width of the gap 512. As such, the wing portions prevent the entire bridging element from moving into the gap area 512. Aptly, the wing span of the wing portions is about 3 times a maximum gap width between the collapse resistant tape windings.

Because of the cross sectional profile of the elongate tape element 508, when the collapse resistant windings are moved closer together, the transitional curved surface of the bridging element will correspond with a curved corner of a collapse resistant wire. Therefore, further stresses between adjacent tape elements are minimised.

Other bridging elements are illustrated in FIGS. 7 to 9 wherein a cross section of the body portion of the bridging element has an alternative shape.

The bridging element 708 of FIG. 7 is approximately an inverted 'T-shape'. The bridging element 708 includes wing portions similar to those described above in relation to bridging element 508 and will therefore not be described again in detail. A body portion 710 of the bridging element 708 extends along the length of the gap 712, substantially along the full length of the gap in this embodiment. Wing portions extend axially from an end of the body portion 710 similarly to FIG. 6. The body portion 710 is configured such that sides 721 and 722 will abut with respective side walls 704 and 705 of the adjacent collapse resistant tape windings when the gap 712 between the windings decreases.

It will be realised that the radial length of the body portion 710 may be different to that shown, for example extending about 90%, or 80%, or 70%, or 60%, or 50%, or 40%, or 30%, or 20%, or 10%, or 2%, along a radial length of the gap 712, and may be discontinuous or vary in radial length along the elongate length of the bridging element. Likewise, the width of the body portion may also be different to the relatively thin width shown, extending about 100%, or 90%, or 80%, or 70%, or 60%, or 50%, or 40%, or 30%, or 20%, or 10%, or 2% of the maximum gap width between adjacent windings. In an alternative embodiment, the body portion 710 of the elongate bridging element may contain a wave or non-linearity formed into it when laid on a flat surface so that when the bridging element is formed around the barrier layer 502, with the surfaces 514 and 520 in contact, the waviness in the body portion is removed due to the higher circumferential strain at the upper radial end of the body portion compared with the lower radial end of the body portion (as shown in FIGS. 17a and 17b).

FIG. 8 shows a further bridging element/elongate tape element 808 having an approximately inverted 'T-shape'. Here, the body portion 810 has an approximate U-shaped profile, with a first side portion 824, a base portion 826 and a further side portion 825. Wing portions extend from the base portion 826 of the body portion 810, similarly to FIG. 6.

In this bridging element, the first side portion 824 and further side portion 825 abut with respective side walls 804, 805 of adjacent collapse resistant tape windings. Here the first side portion 824 and further side portion 825 extend substantially along the full length of the gap 812.

The first side portion 824 and further side portion 825 can be considered as prongs. The prongs should be of a material capable of a degree of flexibility, such as steel or a relatively high elastic modulus polymeric material, such that as adjacent collapse resistant tape windings move closer together, the prongs can bend from near the base portion 826 to move closer together at an open end portion 828. Such relatively high modulus polymers could include some PVDF materials, composites or alloys with an elastic modulus greater than 400 MPa when measured at room temperature. Aptly the elastic modulus of the polymer material could be greater than 800 MPa. Aptly the elastic modulus of the polymer material could be greater than 1000 MPa. Aptly the elastic modulus of the composite material could be 20-50 GPa. Aptly the elastic modulus of the composite material could be 70-80 GPa. Aptly the elastic modulus of a metallic material of the prongs could be 170-210 GPa. Aptly the elastic modulus of the metallic material could be 190-210 GPa.

FIG. 9 shows a further bridging element/elongate tape element 908 having an approximately inverted 'T-shape'. The bridging element 908 has a similar cross sectional profile to that shown in FIG. 7. However, the body portion 910 is wider than that of the embodiment of FIG. 7, being approximately the width of the maximum gap width 912.

The bridging element is at least partially compressible, yet with sufficient strength to prevent substantial ingress of a polymer barrier layer into the gap 912. The bridging element may be non-metal, a polymer, an elastomer, a rubber, a foam, or any other resilient material suitable to be temporarily compressed when adjacent windings of collapse resistant tape move closer together, or be constructed from an internal skeleton structure such as 710 or 810 while being encapsulated by, or encapsulating a suitably compressible resilient material as described above. Suitably compressible materials could have an elastic modulus considerably less than 400 MPa, for instance 150 MPa, for instance 50 MPa, for instance 10 MPa, for instance 1 MPa, for instance 0.08 MPa, and may be a rubber or foamed material. Although the body portion 910 has a width of up to the maximum gap width, if the gap 912 were to decrease in width (such as during bending of a pipe), the compressibility of the material used for the bridging element allows the bridging element to expand and contract in line with the changing gap width.

Of course it will be realised that the radial length of the body portion may be different to that shown, for example extending about 90%, or 80%, or 70%, or 60%, or 50%, or 40%, or 30%, or 20%, or 10%, or 2%, along a radial length of the gap 912, and may be discontinuous or vary in radial length along the elongate length of the bridging element.

FIGS. 10*a* and 10*b* show a yet further a bridging element/elongate tape element 1008 having an approximately 'S-shape'. FIG. 10*a* shows the positioning of the bridging element 1008 when the collapse resistant tape windings 1001$_{1,2}$ are arranged such that the width of the gap 1012 is at its maximum. The bridging element 1008 has a body portion 1010 that extends along the gap 1012 abutting with a side wall 1005 of the adjacent collapse resistant tape winding 1001$_2$. The body portion continues to form a hooked end region 1015, which is substantially hook shaped so as to accommodate a trailing edge of the adjacent collapse resistant tape winding 1001$_2$. The hooked end region 1015 thereby acts to help the bridging element 1008 remain in place with the body portion 1010 abutting the side wall 1005.

The bridging element 1008 further includes a wing portion 1016 that extends from an end region of the body portion to thereby span the maximum width of the gap 1012. The wing portion 1016 further extends between an inner surface 1003 of the collapse resistant tape winding 1001$_1$ and an outer surface of a fluid retaining layer 1002. The wing portion 1016 is larger than the maximum gap width, and aptly 125%, or 150%, or 200%, or 300% of the maximum gap width.

As such, the body portion is effectively connected or attached to one adjacent winding of the pressure armour layer so that it is unable to stray from that position and will remain always adjacent to that side winding whether the gap width is large or small. The wing portion is wide enough such that even at the maximum gap width, the gap is bridged by the wing portion. Physical attachment means such as adhesive may also be used to connect or help connect in lieu of or in addition to the hooked end region of the bridging element to the adjacent pressure armour winding.

FIG. 10*b* shows the positioning of the bridging element 1008 when the collapse resistant tape windings 1001$_{1,2}$ are arranged such that the width of the gap 1012 is at its minimum. In this arrangement the body portion 1010 abuts with side walls of each adjacent collapse resistant tape winding. The wing portion is positioned similarly to in FIG. 10*a*, but a larger portion lies between the inner surface of the collapse resistant tape winding and the outer surface of the fluid retaining layer.

In this Figure the elongate tape element 1016 has a substantially uniform thickness across the cross-sectional profile. That is, the wire/sheet forming body portion 1010 and the wing portion 1016 is of uniform thickness.

FIGS. 11*a* and 11*b* show a similar bridging element in which the thickness across the cross-sectional profile of the bridging element is not uniform. In this a body portion 1110 of a bridging element 1108 is thicker than a wing portion 1116.

In FIGS. 10*a*, 10*b*, 11*a* and 11*b*, the body portion and wing portion are shaped to accommodate the curvature of the adjacent pressure armour layer windings (as can be seen in FIGS. 10*c* and 11 *c*). In each case the wing portion will always extend across the full gap width to prevent any point of ingress for the polymer barrier layer into the gap between windings.

Flexible pipe body may be formed with any of the above-described bridging elements.

During manufacture of a flexible pipe body, a fluid retaining layer is provided. This may be a polymer layer or formed from metals or composites, for example. If a polymer is used, the polymer may be extruded using techniques known in the art to form a tubular polymer layer.

Then, an elongate tape element (as per any of the above) and a collapse resistant tape (e.g. pressure armour wires) are helically wound over the fluid retaining layer to form alternate windings. The elongate tape element is located at least partially within a gap between adjacent collapse resistant tape windings and configured to span the gap so as to abut with a radially inner surface of each adjacent collapse resistant tape winding.

Various modifications to the detailed designs as described above are possible. For example, although the wing portions have been described above with a substantially uniform thickness, the wing portions may be tapered away from the body portion such that while the radially inner surface of the bridging element remains substantially flat to abut with the fluid retaining layer, the radially outer surface may taper or be shaped to correspond with an adjacent collapse resistant tape winding.

An alternative is for a spring or clip of material to be configured to locate in the gap between, and/or around the collapse resistant tape wraps, as shown in FIGS. 12*a*, 12*b*, 12*c*, 13*a*, 13*b*, 13*c*. Such spring or clips would function in a similar manner to the bridging element shown in FIG. 8.

A further alternative bridging element is shown in FIGS. 14, 15*a* and 15*b*. These are similar to those shown in FIG. 5, with slight changes to the design of the body portion.

Although metal has been specified for forming the bridging element, this could be any suitable material with sufficient strength and properties to perform as required. The element may comprise metal, aluminium alloy, non-metal, a polymer, an elastomer, a rubber, a foam or a combination of these, for example a coated metallic sheet, the coating to provide corrosion protection and or wear resistance and or low coefficient of friction (for example 1, 0.5, 0.1, or 0.05).

Although the bridging elements have been described and shown with a body portion of various lengths, this body portion length may be other suitable lengths.

With the above-described arrangements crazing of a barrier layer or liner due to plastic deformation of the layer (plastic hoop strain) is mitigated or prevented.

With the above-described arrangements ingress or creep of a barrier layer or liner into gaps between armour windings can be substantially prevented.

FIGS. 16 and 17 show bridging elements which are shaped in order to increase the ease with which they may be formed around the circumference of a cylindrical structure. FIG. 16*a* shows a nominally T profile bridging element which incorporates a body portion into which a plurality of up-stand sections have been created either by removal of material from the body portion or by cleavage of the body portion (the spaces between these sections are herein after known as "gaps"), providing gaps between body up-stand sections along the bridging element's length, the gaps extending at least part way down the height of the body portion. The dimensions of the gaps in the body portion as a result of cleaving or the removal of material may be consistent along the length of the bridging element, or may vary. Aptly the gaps are in the range 0-25 mm wide. Aptly the gaps are in the range 0-10 mm wide. Aptly the gaps are in the range 0-5 mm wide. The frequency of the gaps per unit length of bridging element may also be consistent or vary, depending on the dimensions of pipe body the bridging element is to be fitted into. The shape of the gaps may be U shaped, or V shaped or such as an inverted key-hole, or other suitable shapes in order to limit or eliminate the risk of stress concentrations leading to fracturing of the bridging element material during bending of the bridging element.

The gaps may be alternatively formed into the bridging element profile during manufacture of the bridging element or after manufacturing the bridging element, either before or during the forming process for inserting the bridging element into the pipe body structure.

The effect of the presence of the gaps in the body portion of the bridging element is that they allow the bridging element to more easily form around a mandrel or underlying layer of pipe body as the radially outermost end of the body portion of the bridging element is able to experience higher levels of strain (as a result of the gaps opening up) without risk of buckling or undesired folding of the body portion. FIG. 16b shows the bridging element formed around a cylindrical structure (not shown) indicating how the gaps open increasingly towards their radially outermost extent on bending the bridging element.

FIG. 17a shows a bridging element which nominally comprises a T profile. The body portion of the element is formed with a crinkled shape along the length of the bridging element. Aptly the crinkle is displayed over at least 10% of the radially outer end of the body portion. The crinkled shape is generally of a sinusoidal form increasing in the sinusoidal wave height towards the radially outer end of the body portion. The crinkle in the body portion may be formed during the manufacture of the bridging element, or just prior to, or during the use of the bridging element in forming a layer in to the pipe body structure. The crinkle may optionally be created through the application of force from rolls either side of the body portion, effectively lengthening the body portion with respect to the wing portion of the bridging element. Aptly the rolls performing this permanent deformation of the body portion are conical (in order to progressively apply more thinning at the radially outermost end of the body portion and therefore direct the greatest extension of the body to that location). Aptly the rolls are asymmetric or convoluted in order to achieve a similar crinkle effect in the body portion. As a result of the crinkling process the radially outermost part of the body portion also exhibits the thinnest section thickness, the thickness tapering outwardly from the radially innermost point at which the deformation has been applied.

FIG. 17b shows the bridging element bent around a cylindrical structure (not shown), indicating how the crinkle straightens out as a result of the bending process, enabling a smooth, uniform curvature to be achieved without risk of buckling or undesired folding of the body portion.

The layer formed as described above may be used in conjunction with any or all of the other flexible pipe body layers as described with reference to FIG. 1.

For example FIG. 18 illustrates how an elongate tape element 1800 can be utilised as a bridging element for bridging a gap 1805 between adjacent windings of a flexible pipe body layer. In particular the pressure resistant layer illustrated in FIG. 18 is a carcass layer 1810. The carcass layer 1810 is a collapse resistant layer. That is to say the carcass layer, in use, helps prevent the pipe from collapsing by resisting flattening of the barrier layer which is formed over the carcass layer in a radially outer location subsequent to formation of the carcass layer 1810. It will be appreciated that in use a fluid communicating bore 1820 is provided by a radially inner surface of the barrier layer formed outside the carcass layer. A radially innermost surface of the carcass layer nevertheless forms a non fluid tight bore against which production fluids flow as they are transported along the length of the flexible pipe.

As illustrated in FIG. 18 the elongate tape element 1810 is located between adjacent primary carcass tape windings which would otherwise present a series of gaps along the length of the carcass layer which might create vortex shedding opportunities. By locating an elongate tape element in these gaps as herein described FLIP caused by such vortex shedding can entirely or at least partially be avoided. As illustrated in FIG. 18 the elongate tape element includes a body portion 1830 that is at least partially locatable between adjacent windings of the collapse resistant layer. The body portion 1830 is at least partially locatable in the gap 1805 between edges of adjacent carcass windings that each have a curved surface region. The central body portion is a folded region of a tape and a first wing portion 1840 and a further wing portion 1850 extend in an axial direction, when duly located between primary carcass layer windings, in an opposed manner away from the central body portion. The first wing portion ends in a first long edge 1860 of the elongate tape element whilst the further wing portion 1850 has a wing end formed at a remaining long edge 1870 of the elongate tape element.

FIG. 19 helps illustrate a method for manufacturing the elongate tape 1800 illustrated in FIG. 18. As illustrated in FIG. 19a sheet 1900 which is a thin narrow strip that is flat and which has a common cross section is wound off a reel of such tape. It will be understood that such reels are often referred to by those skilled in the art as a pancake. The sheet 1900 is a metal sheet. Aptly the tape 1900 is a stainless steel tape. Other materials could of course be optionally utilised as a sheet to produce an elongate tape element. For example the sheet can be a composite material or an aluminium alloy or the like. The sheet 1900 is provided to a first pair 1910 of a plurality (four shown in FIG. 19) of pairs of opposed rollers. The first pair 1910 includes a first upper roller 1912 and a lower roller 1914. The rollers are driven about respective axes which helps draw the tape 1900 presented at a nip point of the first pair of rollers along a roll forming line associated with the pairs of rollers. A second pair of opposed roll forming rollers includes an upper roller 1922 and lower roller 1924. A third pair 1930 of opposed rollers includes an upper roller 1932 and a lower roller 1934. A fourth pair 1940 of opposed rollers includes an upper roller 1942 and a lower opposed roller 1944. Each roller in each pair has a respective profile formed in its outer surface 1950 so that as that the strip is drawn through the nip point of the various pairs of rollers a cross sectional profile is sequentially formed in the tape turning the tape from a substantially flat sheet to an elongate tape element having a body portion and at least one wing portion but retaining a substantially uniform thickness across a resulting cross sectional profile. Although four pairs of roller have been described one, two, three, four, five or more pairs could aptly be used.

FIG. 20A to FIG. 20D illustrate the cross sectional profiles formed by the pairs of opposed rollers illustrated in FIG. 19 as an illustrative way in which a flat sheet can be formed at a relatively low cost and without over complex manufacturing steps being needed into an elongate tape element that can be wound between adjacent windings of a carcass layer to help avoid FLIP. This method of forming is cheaper and less prone to error than other forming techniques such as extrusion or moulding.

Figure 20A:
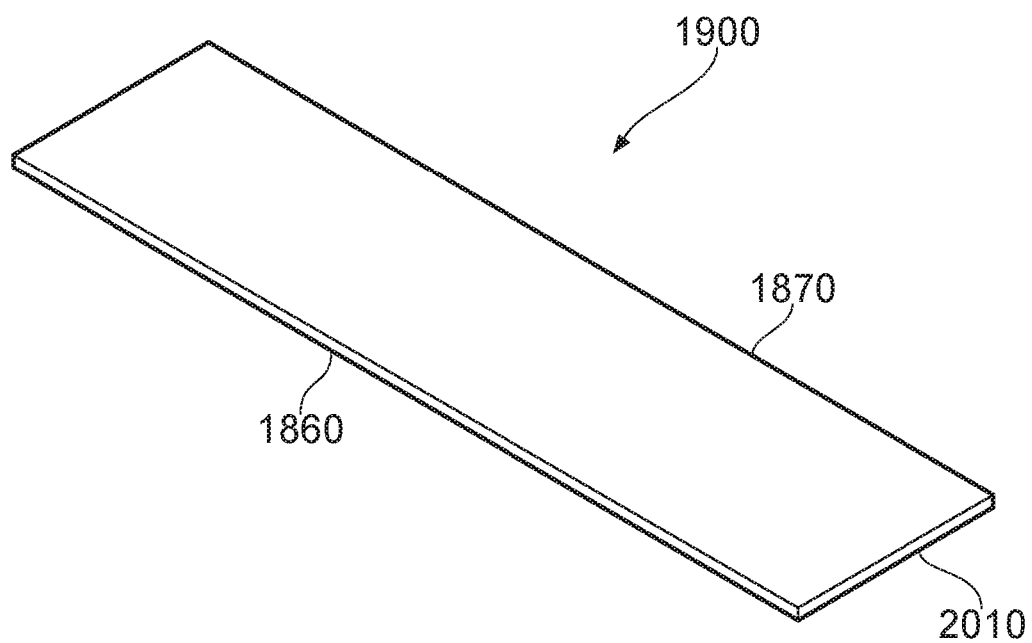

As illustrated in FIG. 20A the starting point is a sheet 1900 that has a substantially uniform thickness extending from a first long edge 1860 to a further long edge 1870. The long edges, 1860 1870 are substantially parallel and arranged in a spaced apart relationship. A leading short edge 2010 of the sheet 1900 is an edge that extends between the first and further long edge. This leading edge 2010 is the edge which is urged between the nip point of the rollers of the first pair of rollers. It will be appreciated that whilst FIG. 20A illustrates a relatively short strip the strip can in fact extend many tens or indeed hundreds or indeed thousands of metres in length. The length of the tape is determined by the storage capacity for storing the flat strip prior to the forming process and/or carcass layer forming process. Starting with a flat strip means new flat strip can be welded to a end of a previous strip easily to help provide a continuous manufacturing process.

Figure 20B:
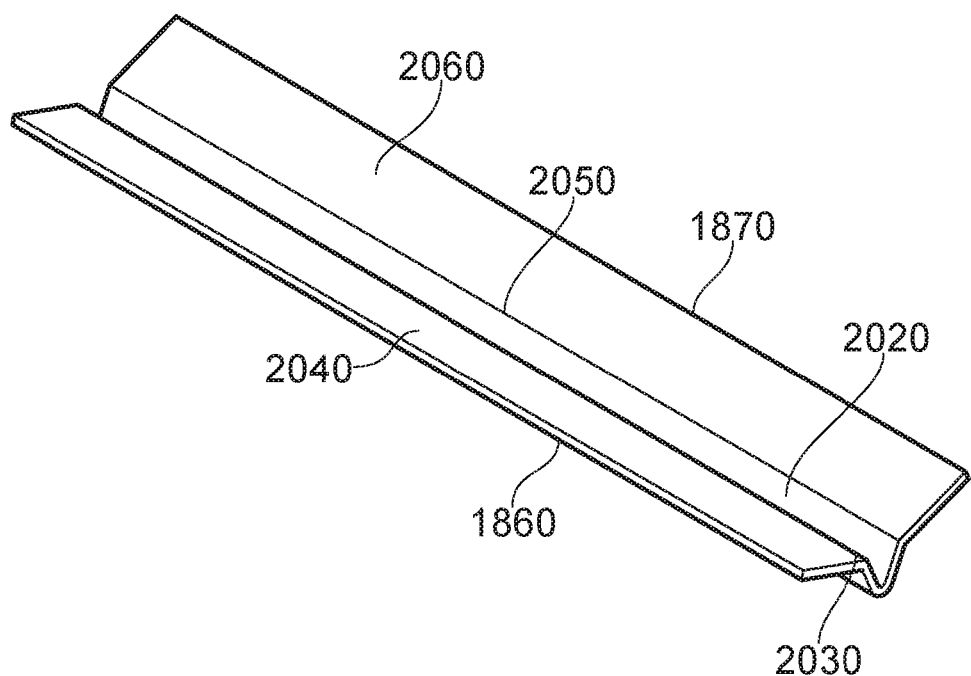

FIG. 20B illustrates the cross sectional profile of the strip subsequent to being rolled between the opposed rollers of the first pair of rollers. As illustrated in FIG. 20B the strip, which starts as a sheet having a flat cross-sectional profile, and which is thus relatively cheap to purchase and transport is formed into a cross section which has a inset region 2020 and a first fold line 2030 leading from the inset region 2020 via a generally flat intermediate region 2040 to the first long edge 1860. A further fold line 2050 is formed by the first pair of rollers in the elongate tape and extends via a generally flat intermediate region 2060 to the remaining further long edge 1870. The folded sheet exiting each pair of rollers until a final pair of rollers provides a precursor for the next pair of rollers. Each fold line can be a sharp fold or a gradual fold line.

Figure 20C:
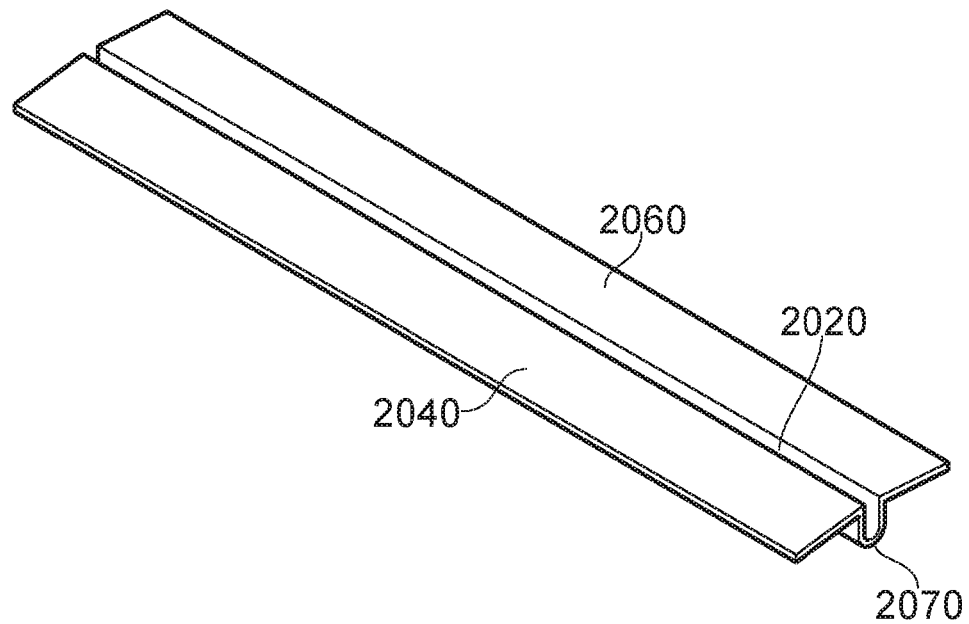

FIG. 20C illustrates the cross sectional profile of the tape as it emerges from the second pair 1920 of opposed rollers. As illustrated in FIG. 20C which is, it will be appreciated, a cross sectional profile formed by modifying the tape element shown in FIG. 20B has had the central inset region 2020 closed somewhat and the generally flat "wings" 2040, 2060 which include the generally flat intermediate regions folded downwards towards a base 2070 of the tape.

Figure 20D:
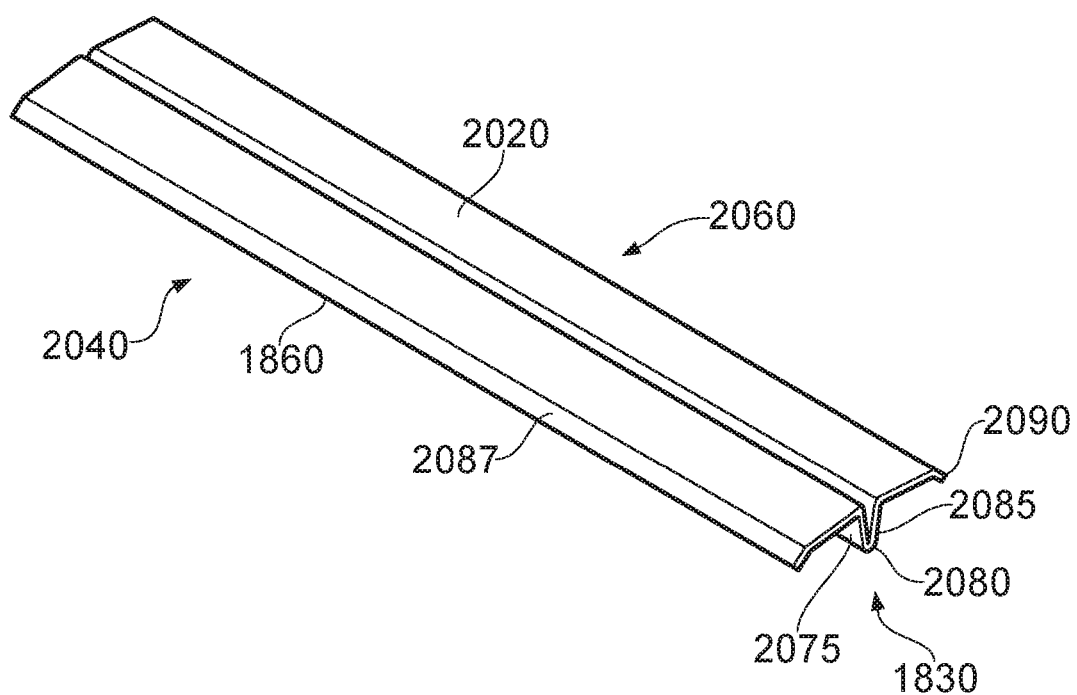

FIG. 20D illustrates a cross sectional profile of the elongate tape element in a final format as generally provided by passing the tape element having a cross section shown in FIG. 20C through the third pair 1930 of opposed rollers. As illustrated in FIG. 20D a central body portion 1805 of the cross sectional profile of the tape is made by urging the inset region 2020 further together. This nipping action creates a body portion having a first side portion 2075 which extends from a base 2080 to a further side portion 2085. As illustrated in FIG. 20D an optional dipped wing tip 2087 is formed in the first wing by inclining downwardly a narrow section of the tape leading to the first long edge 1860. Likewise an optional wing tip region 2090 is formed along a narrow edge of the strip terminating in the remaining long edge 1870 of the tape. The body portion 1830 thus has a substantially U-shaped profile. The body portion extends away from the wings substantially at right angles. Alternatively, as described below, the body portion may be wave-like, arcuate or set at an acute or obtuse angle with respect to a wing. Optionally the side portions of the body portion can be squeezed tightly together to close as much a possible the inset region 2020 which extends longitudinally along the length of the tape. Alternatively the side portions can remain more opened away from the base portion 2080 so as to provide an inset region 2020 having a wider open mouth like area. It will be appreciated that this wider open area can likewise be enhanced by folding the wings about respective fold lines 2030, 2050 having a greater radius of curvature ie. the fold line is not sharp. It will be appreciated by those skilled in the art that the provision of a central inset region which extends longitudinally along the length of the tape, and which can have a selectable width responsive to how closed the channel is in the body portion, can have desirable fluid dynamic effects on the flow of production fluids flowing along the inner surface of the carcass layer formed by the wound carcass windings and the bridging element tape. This can help further reduce vortex shedding/FLIP effects.

The fourth pair of rollers illustrated in FIG. 19 can thus be utilised to confirm the profile of the tape emerging from the third pair of rollers and duly locate and/or direct the thus formed tape in a direction towards either a storage facility where rolls of the tape can be rolled and subsequently stored or directly to a location on a carcass forming station where carcass layer windings having an interlocking structure are duly located and a carcass layer manufactured.

FIG. 21 helps illustrate a cross-sectional profile of primary windings of a carcass layer and how the elongate tape formed via the steps shown in FIGS. 19 and 20 can be located into gaps between adjacent carcass layer windings. For example as shown in FIG. 21a preceding winding 2100 of a carcass layer winding is wound against an underlying substantially cylindrical outer surface of a mandrel (shown more clearly in FIG. 22) and then the elongate tape element 1800 which provides a bridging element is located at an end region 2110 of the preceding carcass layer winding. As illustrated in FIG. 21 at least a part 2120 of the carcass layer winding is a curved surface. The body portion 1830 of the bridging element extends like a nose into the gap 1805. The base 2080 of the body portion is spaced apart from the inset region 2020 which provides a substantially V-shaped inset in a radially inner surface formed by a radially inner surface of each wing 2040, 2060. A succeeding carcass layer winding 2140 is then wound around an underlying cylindrical mandrel layer. This succeeding winding also includes a curved surface 2150 which opposes the curved surface 2120 of the preceding winding. In use the space between successive carcass layer windings increases and decreases as the flexible pipe body flexes. As illustrated in FIG. 21 the wing tips are bent slightly towards respective carcass layer windings and in this way tips of the wings remain at all time in contact with carcass layer windings. This helps avoid production fluids in use from flowing under the elongate tape 1800. The tips which are dipped ride along a surface of the carcass windings and help minimise the contact area between the elongate tape 1800 and respective carcass layer windings so as to maximise flexibility in the flexible pipe body.

FIG. 22 helps illustrate how primary carcass layer tape which has a substantially S or Z cross-sectional profile can be wound onto an outer cylindrical surface 2200 of a mandrel at a carcass forming station. It is to be noted that part of the cylindrical outer surface of the mandrel is illustrated in FIG. 22. A carcass layer tape having a preformed cross section is provided to the carcass layer forming station in a direction illustrated by arrow X and is guided onto the outer surface 2200 of the mandrel via a first support roller 2210. This roller and successive rollers 2220, 2230 circumferentially arranged around the mandrel have outer surfaces which are profiled to include guides for both the primary carcass layer tape and the elongate tape 1800 which is introduced at the winding station in a direction illustrated by arrow Y. As illustrated in FIG. 22 successive windings of the carcass layer of the primary carcass layer tape interlock to form an interlocked structure which does not require the support of the mandrel. An inner surface of the carcass layer so produced is provided by a radially inner surface of primary carcass layer windings and radially inner surface regions of the elongate tape 1800. As a result the carcass layer itself presents an essentially smooth or almost smooth inner bore along which production fluids can flow in use. Because the inner surface is substantially smooth vortex shedding is minimised during transportation of production fluids and thus FLIP can entirely or at least partially be avoided.

FIG. 23 helps illustrate an alternative cross-sectional profile of an elongate tape element which can be used as a bridging element 2300. In more detail FIG. 23 illustrates how a body portion 2330 includes a bent region 2332 and a first substantially linear intermediate region 2334 which extends to a respective long edge 1860 of the tape. A wing tip region 2336 is downturned slightly in a dipped fashion. A central inset region 2340 is provided which is substantially V-shaped. This is located where a first side portion 2344 of the body portion 2330 is nipped against a further side wall 2346 of the body portion 2330. The side walls of the body portion are thus in an abutting relationship. The further side wall 2346 extends through a folded region 2348 via a further substantially linear intermediate region 2354 to the remaining long edge 1870 of the tape. The cross-sectional profile thus only includes dipped wing tips, which extend from the respective edges of the tape, respective intermediate regions of the tape and a central folded region. As a result very few folding steps are required during manufacture and the bridging element so-made can be made starting from a single flat strip using a forming process.

FIG. 24 illustrates an alternative cross-sectional profile for a bridging element 2400 formed via a similar but slightly different manufacturing technique in which wing tip regions 2436 are not dipped downwardly but rather have a substantially planar radially outer surface 2444, 2446 but with tapered wing tips. That is to say tips which lead to the respective long edges 1860, 1870 of the strip are tapered to form a narrowing point towards long edges of the bridging element. Aptly the taper is provided by compressing the material of the elongate tape at the long edges.

FIG. 25 illustrates an alternative cross-sectional profile for a bridging element 2500 in which wing tips are downturned. That is to say are turned inwardly at a side of the cross-sectional profile where the body portion is located Additionally each of the wing tips 2536 2538 are tapered by shaving or compression.

FIG. 26 illustrates a further alternative cross-sectional profile for a bridging element 2600 in which wing tips 2636, 2638 are produced by creating respective long edges of the tape via a cutting action. The cutting action used to create the flat strip which is subsequently folded to create the cross-sectional profile shown in FIG. 26 has an effect of consolidating material at one surface of the flat tape so as to form a curved region 2640, 2642 and this helps provide a pointed region 2650, 2652. This helps minimise the material in contact with adjacent primary carcass layer windings in use and helps the bridging element ride smoothly along surfaces of adjacent carcass windings as the flexible pipe body flexes in use. The wing tip regions can be created in a very straightforward manner without complex manufacturing steps by cutting the strip using opposed scissor-like cutting tools.

FIG. 27 illustrates adjacent windings of a carcass layer with an alternative bridging element 2700 which has a body portion slightly leant towards a particular long edge/wing of the bridging element. This attitude can be created during the manufacturing step for providing the bridging element. The bridging portion 2730 forms an obtuse angle with a line or plane associated with the first wing terminating in the first edge 1860 of the tape whilst the bridging portion 2730 forms an acute angle with a line/plane associated with the further wing which terminates in the further long end 1870. This non-orthogonal orientation helps duly locate the body portion in the particular shape of gap between adjacent curved surfaces of primary carcass layer windings.

Using bridging elements that have dipped and/or tapered ends to the wing tips helps streamline the way in which the tape lies over primary carcass layer windings which helps provide smooth fluid flow along the flexible pipe.

FIG. 28 illustrates a bridging element. The body portion of the bridging element 2800 is formed with a crinkled shape along the length of the bridging element. Aptly the crinkled shape is displayed over at least 10 percent of the radially outer end of the body portion. The crinkled shape is generally of a sinusoidal form increasing in sinusoidal wave height towards the radially outer end of the body portion. The crinkle in the body portion may be formed during the manufacture of the bridging element or just prior to, or during the use of the bridging element in forming a layer in a pipe body structure. The crinkle is optionally be created through the application of force from rolls on either side of the body portion. This has the effect of effectively lengthening the body portion with respect to the wing portion of the bridging element. This has the effect of making a cross-sectional profile thickness in the wings and the parts of the body of slightly different widths however the cross-section retains a substantially uniform thickness as it is manufactured in the first instance from a flat strip which has a uniform thickness and the thinning, due to rolling, is of a limited nature. Aptly the rolls performing the permanent deformation of the body portion are conical (in order to progressively apply more thinning at the radially outermost end of the body portion and therefore direct a greatest extension of the body to that location). Aptly the rolls are asymmetric or convoluted in order to achieve a similar crinkle effect in the body portion. As a result of the crinkling process the radially outermost part of the body portion also exhibits the thinnest section thickness. The thickness tapering outwardly from the radially innermost point at which the deformation has been applied. Nevertheless the elongate tape element retains a substantially uniform thickness across the cross-sectional profile. The effect on thickness is shown in an exacerbated form in the figures to help show the effect. In practice the change in thickness would be almost imperceptible.

FIG. 29 illustrates the bridging element shown in FIG. 28 bent around a cylindrical structure (not shown), indicating how the crinkle straightens out as a result of the bending process, enabling a smooth, uniform curvature to be achieved without risk of buckling or undesired folding of the body portion.

With the above-described arrangements, the body portion and wing portion or portions are arranged such that even at a maximum gap width, and even with the body portion located in its most extreme position abutting a left side wall or right side wall, the gap between windings will still be covered by the wing portion(s) and optionally also the body portion.

The present disclosure also includes the subject matter of the following numbered paragraphs;

1. An elongate tape element for forming a helically wound layer of windings in a flexible pipe body, the tape being configured for alternate winding with a collapse resistant tape in a helical manner to form a collapse resistant layer, wherein the tape element has a cross-sectional profile comprising:
    a body portion for being positioned between collapse resistant tape windings such that each body portion lies at least partially in a gap between adjacent collapse resistant tape windings; and
    at least one wing portion extending from an end region of the body portion, the at least one wing portion configured to span the gap and respectively abut with a radially inner surface of an adjacent collapse resistant tape winding.
2. An elongate tape element as described in paragraph 1 wherein the at least one wing portion and optionally also the body portion form a substantially flat radially inner surface for abutting with an underlying fluid retaining layer.
3. An elongate tape element as described in paragraph 1 or paragraph 2 wherein the tape is configured for alternate winding with the collapse resistant tape comprising an elongate band of material having a substantially Z-shaped cross-sectional profile, the profile having substantially rectangular main body and a leading edge and a trailing edge.
4. An elongate tape element as described in any of paragraphs 1 to 3 wherein the tape element is substantially an inverted T shape.
5. An elongate tape element as described in any of paragraphs 1 to 3 wherein the body portion comprises two or more prongs extending from the wing portions.
6. An elongate tape element as described in any of paragraphs 1 to 5 wherein the body portion abuts a respective side wall of each adjacent collapse resistant tape winding.
7. An elongate tape element as described in any of paragraphs 1 to 6 wherein a wing span of the wing portions is about 3 times a maximum gap width between the collapse resistant tape windings.
8. An elongate tape element as described in any of paragraphs 1 to 7 wherein the elongate tape element comprises a metal.
9. An elongate tape element as described in any of paragraphs 1 to 7 wherein the elongate tape element comprises a non-metal, a polymer, an elastomer, a rubber, a foam, a composite, an alloy of different materials, or coated materials.
10. An elongate tape element as described in paragraph 9 wherein the body portion extends at least 2% along a radial length of the gap.
11. An elongate tape element as described in paragraph 9 wherein the body portion is at least partly discontinuous or varies its radial length along the tape.
12. A flexible pipe body comprising a collapse resistant layer having an elongate tape element as described in any of paragraphs 1 to 11, the tape being alternately wound with a collapse resistant tape in a helical manner.
13. A flexible pipe body for transporting fluids from a subsea location comprising:
    a fluid retaining layer;
    an armour layer comprising
        a collapse resistant tape helically wound around the fluid retaining layer wherein adjacent windings of the tape interlock such that a gap is present between adjacent windings, and
        an elongate tape element alternately wound with the collapse resistant tape in a helical manner to form the armour layer such that the elongate tape element is located at least partially within said gap and configured to span the gap, and arranged in an abutting relationship with said fluid retaining layer.
14. A method of manufacturing a flexible pipe body, comprising:
    providing a fluid retaining layer; and
    helically winding an elongate tape element and a collapse resistant tape over the fluid retaining layer to form alternate windings, wherein the elongate tape element is located at least partially within a gap between adjacent collapse resistant tape windings and configured to span the gap so as to abut with a radially inner surface of each adjacent collapse resistant tape winding.
15. An elongate tape element substantially as hereinbefore described with reference to the accompanying drawings.
16. Flexible pipe body substantially as hereinbefore described with reference to the accompanying drawings.
17. A method substantially as hereinbefore described with reference to the accompanying drawings.

It will be clear to a person skilled in the art that features described in relation to any of the embodiments described above can be applicable interchangeably between the different embodiments. The embodiments described above are examples to illustrate various features of the invention.

As used herein, the term "collapse resistant layer" or "collapse resistant wire" or similar terms have been used to broadly identify one layer or wire of a pipe body provided to resist collapse of the pipe body or resist pressure applied to the pipe body (external or internal pressure). As described above, such collapse resistant layers may be a pressure armour layer or a carcass layer, for example.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An elongate tape element, for bridging a gap between longitudinally adjacent windings of a flexible pipe body layer that interlock, wherein a hooked first region of a first winding interlocks with a hooked second region of an adjacent winding such that the hooked first region of the first winding abuts the hooked second region of the adjacent winding in a greatest longitudinal separation between the first winding and the adjacent winding, the elongate tape element having a cross-sectional profile comprising:
 a body portion at least partially locatable in the gap between the adjacent windings that interlock of the flexible pipe body layer;
 a first wing portion extending from the body portion to a first wing end; and a further wing portion extending from the body portion to a further wing end;
 wherein the first wing portion and the further wing portion extend axially, and the body portion extends radially;
 wherein the elongate tape element has a substantially uniform thickness across the cross-sectional profile;
 and wherein the cross sectional profile only comprises:
  the first wing portion that extends from the first wing end at a long edge of the tape element to the body portion via a first substantially linear intermediate portion;
  the body portion which comprises a folded central portion of the profile;
  and the further wing portion that extends from the further wing end at a further long edge of the tape element to the body portion via a further, substantially linear, intermediate portion.

2. The tape element as claimed in claim 1, further comprising:
 each wing portion comprises a substantially flat inner surface region.

3. The tape element as claimed in claim 1, further comprising:
 a wingspan between the first wing end and the further wing end is larger than a maximum possible width of the gap.

4. The tape element as claimed in claim 1, further comprising:
 the body portion is at least partially locatable in a gap between edges of adjacent windings that each have a curved surface.

5. The tape element as claimed in claim 1 further comprising:
 the body portion is at least partially locatable between adjacent windings of a collapse resistant layer.

6. The tape element as claimed in claim 1, further comprising:
 high elastic modulus polymeric or composite material element is a relatively fine elongate tape.

7. The tape element as claimed in claim 1, further comprising;
 the elongate tape element is helically windable between successive windings that provide said adjacent windings of a layer of a flexible pipe.

8. The tape element as claimed in claim 1, further comprising:
 the first and further wing portions each extend from an end region of the body portion.

9. The tape element as claimed in claim 1, further comprising:
 an outer surface region of each of the first and further wing portions is locatable to abut with an inner surface region of the adjacent windings.

10. The tape element as claimed in claim 1 wherein the cross-sectional profile is approximately T-shaped.

11. The tape element as claimed in claim 1 wherein the body portion has an approximately U-shaped profile.

12. The tape element as claimed in claim 1, further comprising:
 the substantially uniform thickness of the cross-section comprises tapered away wing portions that have a surface region that is tapered.

13. The tape element as claimed in claim 1, further comprising:
 the first wing portion further comprises a first wing tip region between the first wing end and the first intermediate portion; and
 the further wing portion further comprises a further wing tip region between the further wing end and the further intermediate portion.

14. The tape element as claimed in claim 13, further comprising:
 each wing tip region is tapered at a respective wing end.

15. The tape element as claimed in claim 1, wherein the flexible pipe is for rough bore applications.

16. The tape element as claimed in claim 1, wherein the elongate tape element is locatable at least partially within the gap to span the gap so as to abut with a radially inner surface of each adjacent winding.

17. The tape element as claimed in claim 1, further comprising:
 the body portion and wing portions arranged such that even at a maximum gap width, and even with the body portion located in its most extreme position abutting a left side wall or right side wall, the gap between windings will still be covered by the wing portions and the body portion.

18. The tape element as claimed in claim 1, further comprising:
 a wing span of the wing portions that is larger than a maximum possible width of the gap.

* * * * *

UNITED STATES PATENT AND TRADEMARK OFFICE
CERTIFICATE OF CORRECTION

| | |
|---|---|
| PATENT NO. | : 10,683,951 B2 |
| APPLICATION NO. | : 14/783827 |
| DATED | : June 16, 2020 |
| INVENTOR(S) | : Andrew Peter Roberts |

Page 1 of 1

It is certified that error appears in the above-identified patent and that said Letters Patent is hereby corrected as shown below:

In the Claims

Column 23, Line 30, Claim 1, delete "cross sectional" and insert --cross-sectional--.

Column 24, Lines 2-4, Claim 6, delete "high elastic modulus polymeric or composite material element is a relatively fine elongate tape." and insert --the elongate tape element is a relatively high elastic modulus polymeric or composite material.--.

Signed and Sealed this
Sixth Day of October, 2020

Andrei Iancu
*Director of the United States Patent and Trademark Office*